US010117247B2

(12) United States Patent
Zeng et al.

(10) Patent No.: US 10,117,247 B2
(45) Date of Patent: Oct. 30, 2018

(54) WINDOWING METHODS FOR EFFICIENT CHANNEL AGGREGATION AND DEAGGREGATION

(71) Applicant: Futurewei Technologies, Inc., Plano, TX (US)

(72) Inventors: Huaiyu Zeng, Red Bank, NJ (US); Xiang Liu, Marlboro, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 232 days.

(21) Appl. No.: 15/057,645

(22) Filed: Mar. 1, 2016

(65) Prior Publication Data

US 2016/0270080 A1 Sep. 15, 2016

Related U.S. Application Data

(60) Provisional application No. 62/132,957, filed on Mar. 13, 2015.

(51) Int. Cl.
*H04W 72/04* (2009.01)
*H04L 5/06* (2006.01)
(Continued)

(52) U.S. Cl.
CPC ........... *H04W 72/0453* (2013.01); *H04J 1/08* (2013.01); *H04L 5/06* (2013.01); *H04L 25/03834* (2013.01); *H04L 27/2636* (2013.01); *H04L 5/001* (2013.01); *H04L 5/0023* (2013.01); *H04L 5/0035* (2013.01); *H04L 5/0044* (2013.01); *H04W 88/085* (2013.01)

(58) Field of Classification Search
CPC ........... H04L 25/03834; H04L 27/2636; H04L 5/001; H04L 5/004; H04W 72/0453
See application file for complete search history.

(56) References Cited

U.S. PATENT DOCUMENTS

2004/0083093 A1* 4/2004 Lee .......................... G10L 17/26
704/206
2008/0080862 A1* 4/2008 Shen .................. H04J 14/0227
398/66

(Continued)

OTHER PUBLICATIONS

"High-Capacity Multi-Channel Radio over Fiber (RoF)," International Telecommunication Union, Telecommunication Standardization Sector, COM 15, Study Group 15—Contribution, Question 2/15, Shenzhen, Mar. 2-5, 2015, 4 pages.

(Continued)

*Primary Examiner* — Steven H Nguyen
*Assistant Examiner* — Nourali Mansoury
(74) *Attorney, Agent, or Firm* — Conley Rose, P.C.

(57) ABSTRACT

A method implemented in a fronthaul communication unit, comprising applying, via a processor of the fronthaul communication unit, a plurality of first frequency-domain windowing (FDW) functions on a plurality of first communication channel signals to produce a plurality of first windowed signals, aggregating, via the processor, the plurality of first windowed signals to produce a first aggregated signal, and transmitting, via a frontend of the fronthaul communication unit, the first aggregated signal to a corresponding fronthaul communication unit over a fronthaul communication link to facilitate fronthaul communication.

15 Claims, 22 Drawing Sheets

(51) Int. Cl.
*H04J 1/08* (2006.01)
*H04L 25/03* (2006.01)
*H04L 27/26* (2006.01)
*H04L 5/00* (2006.01)
*H04W 88/08* (2009.01)

(56) References Cited

U.S. PATENT DOCUMENTS

| | | | | |
|---|---|---|---|---|
| 2008/0122695 | A1* | 5/2008 | Wang | G01S 5/0252 342/451 |
| 2008/0154614 | A1* | 6/2008 | Griffin | G10L 19/10 704/500 |
| 2012/0057572 | A1* | 3/2012 | Evans | H04W 88/085 370/338 |
| 2012/0089391 | A1* | 4/2012 | Griffin | G10L 19/10 704/207 |
| 2012/0158409 | A1* | 6/2012 | Nagel | G10L 19/0208 704/500 |
| 2014/0031049 | A1* | 1/2014 | Sundaresan | H04W 16/02 455/447 |
| 2014/0286256 | A1* | 9/2014 | Chowdhury | H04L 47/56 370/329 |
| 2014/0334305 | A1* | 11/2014 | Leroudier | H04W 24/00 370/235 |
| 2014/0376674 | A1* | 12/2014 | Zeng | H04L 27/2662 375/354 |
| 2014/0378047 | A1* | 12/2014 | Kennard | H04B 7/15535 455/22 |
| 2015/0365934 | A1 | 12/2015 | Liu et al. | |

OTHER PUBLICATIONS

Zeng, et al., "Digital Representations of Analog Signals and Control Words Using Different Multi-Level Modulation Formats," U.S. Appl. No. 14/853,478, filed Sep. 14, 2015, Specification 28 pages with 11 pages of drawings.

* cited by examiner

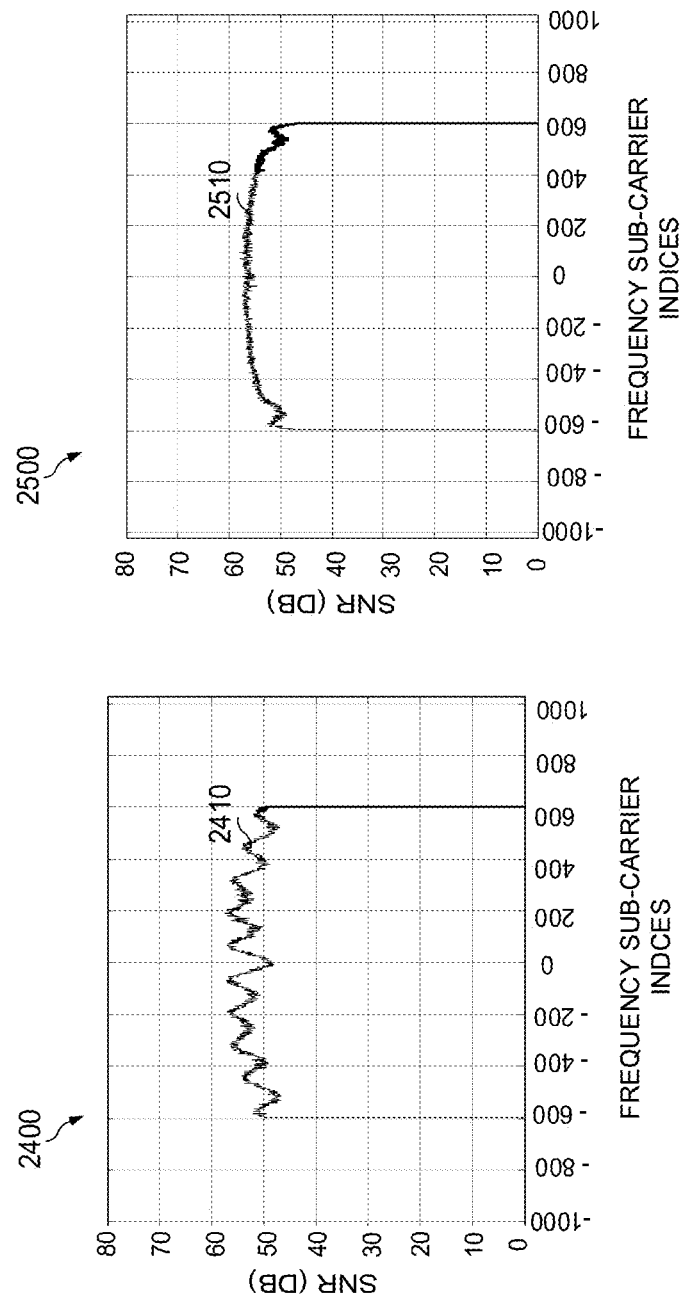

WINDOWING METHODS FOR EFFICIENT CHANNEL AGGREGATION AND DEAGGREGATION

CROSS-REFERENCE TO RELATED APPLICATIONS

The present application claims priority to U.S. Provisional Patent Application 62/132,957, filed Mar. 13, 2015 by Huaiyu Zeng and Xiang Liu, and entitled "Windowing Methods for Efficient Frequency-Domain Channel Aggregation and Deaggregation," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) refers to a network between mobile devices and a core network. In traditional wireless macro-cell networks, an area may be geographically divided into a plurality of cells and cell sectors, each served by a wireless base station communicating with a core network. The part of the RAN between the wireless base stations and the core network is referred to as the wireless backhaul. As the demand for high-speed wireless communications continues to increase, reaching the limits of macro cells in terms of the number of locations and penetration capability in indoor or densely-populated areas, research and industry are moving towards small-cell deployments with denser and smaller cells.

Wireless fronthaul and mobile fronthaul are emerging network segments that enable a centralized-RAN (C-RAN) architecture suitable for small-cell deployments. In a C-RAN architecture, the digital baseband (BB) processing that is typically performed at wireless base stations located at remote cell sites is relocated to centralized baseband units (BBUs) located at a central site nearby a central office (CO) or core network. As such, the wireless base stations located at remote cell sites are replaced by remote radio units (RRUs) that interface with antennas for wireless radio frequency (RF) transmissions and receptions with limited digital BB processing. Wireless fronthaul refers to the part of the RAN between the RRUs and the BBUs. By relocating the digital BB processing to the centralized BBUs, the C-RAN architecture may enable resource sharing and coordinated multipoint (CoMP) processing, such as joint signal processing, joint interference mitigation, and/or joint scheduling among multiple antennas in cells, and thus may improve network performance and efficiency.

Wireless fronthaul may be enabled by optical fiber communication technologies, where optical fiber links may be employed for transporting signals and/or data between the RRUs located at the remote cell sites and the BBUs located at the central site. Some advantages of optical fiber transmissions may include low power loss, low latency, and high bandwidths (BWs). However, the employments of optical fibers and optical hardware add cost to the wireless fronthaul network. Thus, efficient usage of optical fiber links and optical hardware may be important in wireless fronthaul design.

SUMMARY

In one embodiment, the disclosure includes a method implemented in a fronthaul communication unit, comprising applying, via a processor of the fronthaul communication unit, a plurality of first frequency-domain windowing (FDW) functions on a plurality of first communication channel signals to produce a plurality of first windowed signals, aggregating, via the processor, the plurality of first windowed signals to produce a first aggregated signal, and transmitting, via a frontend of the fronthaul communication unit, the first aggregated signal to a corresponding fronthaul communication unit over a fronthaul communication link to facilitate fronthaul communication. In some embodiments, the disclosure also includes selecting, via the processor, the plurality of first FDW functions according to spectral properties of the plurality of first communication channel signals and/or performing, via the processor, a plurality of discrete Fourier transforms (DFTs) on the plurality of first communication channel signals before applying the plurality of first FDW functions, wherein aggregating the plurality of first windowed signals comprises performing a frequency-division multiplexing (FDM) on the plurality of first windowed signals to produce a frequency-multiplexed signal, and/or applying, via the processor, a frequency-shifting (FS) function to one of the plurality of first communication channel signals in a time domain before performing a first of the plurality of DFTs, and wherein the FS function comprises $$FS1(k) = \exp^{\frac{-j \times 2 \times \pi \times k}{2K}},$$

where $FS1(k)$ represents the FS function, exp represents an exponential function, j represents a square root of minus one, $\pi$ represents the value 3.14159, k represents a time sample index of the one of the plurality of first communication channel signal in a time frame of K samples, and K corresponds to a size of the first DFT, and/or wherein aggregating the plurality of first windowed signals further comprises performing an inverse DFT (IDFT) after applying the plurality of first FDW functions to produce an aggregated time signal, applying a time-domain windowing (TDW) function to the aggregated time signal to produce a time-domain windowed signal, and generating the first aggregated signal according to the time-domain windowed signal, and/or further comprising performing, via the processor, a plurality of DFTs on the plurality of first communication channel signals before applying the plurality of first FDW functions, and performing, via the processor, a plurality of IDFTs on the plurality of first windowed signals, wherein aggregating the first plurality of windowed signals comprises performing a time-division multiplexing (TDM) on the plurality of first windowed signals after performing the plurality of IDFTs, and/or receiving, via the frontend, a second aggregated signal from the fronthaul communication link, wherein the second aggregated signal comprises a plurality of second communication channel signals, demultiplexing, via the processor, the second aggregated signal to produce a plurality of demultiplexed signals corresponding to the plurality of second communication channel signals, and applying, via the processor, a second FDW function to a first of the plurality of demultiplexed signals to produce a second windowed signal, and/or wherein demultiplexing the second aggregated signal comprises performing, via the processor, a DFT on the second aggregated signal to produce an aggregated frequency signal, and performing, via the processor, a frequency-division demultiplexing on the aggregated frequency signal to produce the plurality of demultiplexed signals, and/or further comprising performing, via the processor, an inverse DFT (IDFT) on the second windowed signal to produce a time signal, and applying, via the processor, a frequency-shifting (FS) function to the time signal to produce a frequency-shifted signal, wherein the FS function comprises $$FS2(k) = \exp^{\frac{j \times 2 \times \pi \times k}{K}},$$

where FS2(k) represents the FS function, exp represents an exponential function, j represents the square root of minus one, π represents the value 3.14159, k represents a time sample index of the time signal in a time frame of K time samples, and K corresponds to a size of the IDFT, and/or further comprising applying, via the processor, a TDW function to the time signal before applying the FS function, and/or wherein demultiplexing the second aggregated signal comprises performing, via the processor, a time-division demultiplexing on the second aggregated signal, and wherein the method further comprises performing, via the processor, a DFT on the first demultiplexing signal before applying the second FDW function, and performing, via the processor, an IDFT on the second windowed signal to produce a time signal.

In another embodiment, the disclosure includes a wireless fronthaul unit comprising a processor configured to apply a plurality of FDW functions to a plurality of wireless channel signals comprising digital in-phase quadrature-phase (IQ) samples to produce a plurality of windowed signals, and aggregate the plurality of windowed signals to produce an aggregated signal, and a frontend coupled to the processor and configured to transmit the aggregated signal to a corresponding wireless fronthaul unit over a wireless fronthaul link to facilitate wireless fronthaul communication, and/or wherein the processor is further configured to perform a plurality of fast Fourier transforms (FFTs) on the plurality of wireless channel signals before applying the plurality of FDW functions, and aggregate the plurality of windowed signals further by performing frequency-division multiplexing (FDM), and/or wherein a first of the plurality of FDW functions comprises an even number of FDW coefficients, wherein a first half of the FDW coefficients is symmetrical to a second half of the FDW coefficients, wherein the first FDW function is applied to a first of the plurality of wireless channel signals, and wherein the processor is further configured to rotate a phase of the first of the plurality of wireless channel signals in a time domain before performing a first of the plurality of FFTs so that the first of the plurality of wireless channel signals comprises symmetrical positive frequency components and negative frequency components after performing the first FFT, and/or wherein the processor is further configured to aggregate the plurality of windowed signals further by performing an inverse FFT (IFFT) after performing the FDM to produce an aggregated time signal, applying a time-domain windowing (TDW) function to the aggregated time signal to produce a time-domain windowed signal, and generating the aggregated signal according to the time-domain windowed signal, and/or wherein the wireless fronthaul unit is a RRU, and wherein the plurality of wireless channel signals are uplink (UL) signals, and/or wherein the wireless fronthaul unit is a BBU, and wherein the plurality of wireless channel signals are downlink (DL) signals.

In yet another embodiment, the disclosure includes a wireless fronthaul unit comprising a frontend configured to receive an aggregated signal comprising a plurality of wireless channel signals via a wireless fronthaul link, and a processor configured to demultiplex the aggregated signal to produce a plurality of demultiplexed signals corresponding to the plurality of wireless channel signals, and apply a FDW function to a first of the plurality of demultiplexed signals to produce a windowed signal, and/or wherein the processor is further configured to demultiplex the aggregated signal by performing a fast Fourier transform (FFT) on the aggregated signal to produce an aggregated frequency signal, and performing frequency-division demultiplexing on the aggregated frequency signal, and/or wherein the process is further configured to perform an IFFT on the windowed signal to produce a time signal, apply a TDW function to the time signal to produce a time-domain windowed signal, and apply a FS function to the time-domain windowed signal to produce a frequency-shifted signal.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 24 is a graph illustrating a simulated SNR plot of an aggregated LTE signal generated with FDW and FS according to an embodiment of the disclosure.

FIG. 25 is a graph illustrating a simulated SNR plot of an aggregated LTE signal with FDW, FS, and TDW according to an embodiment of the disclosure.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
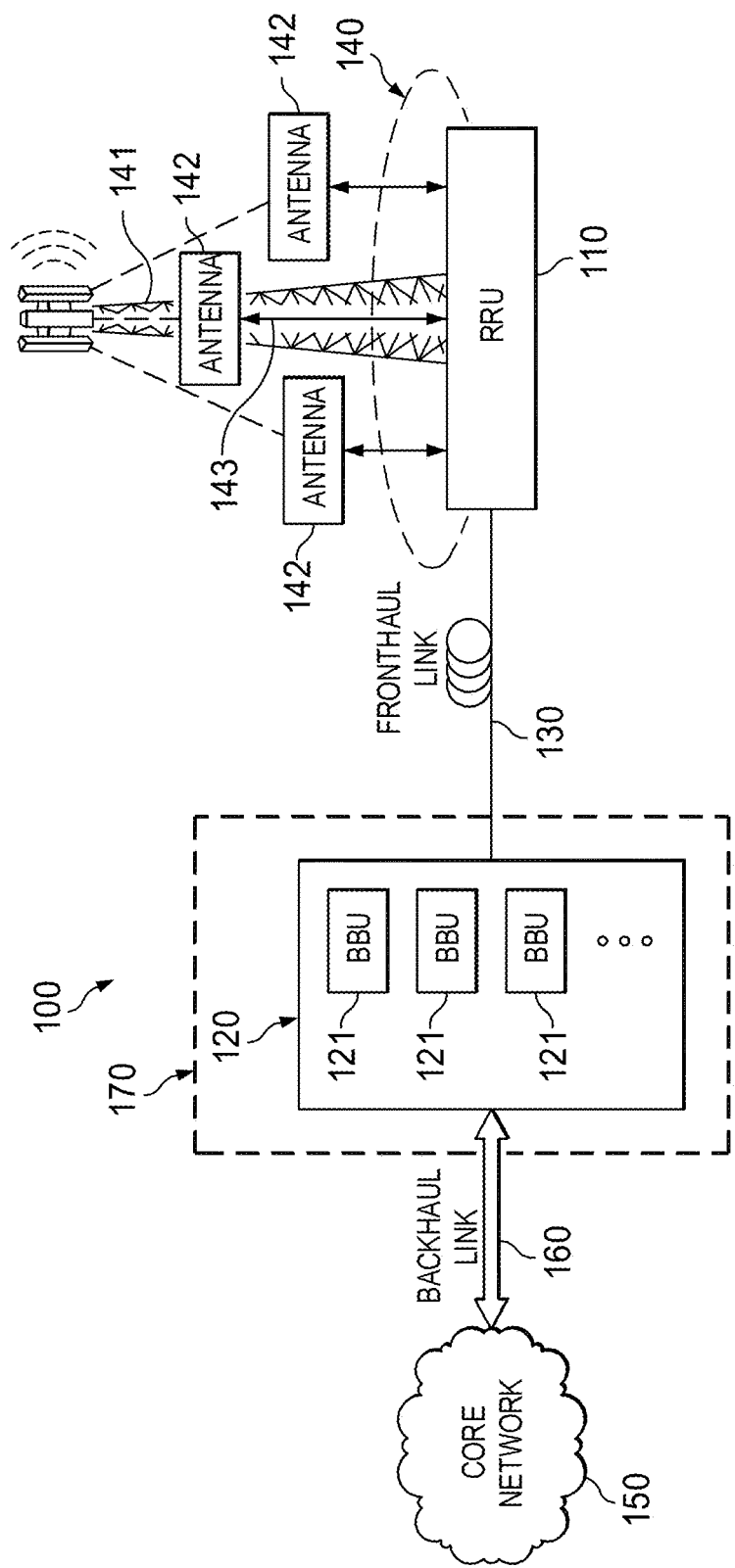
FIG. 1 is a schematic diagram of an aggregated wireless fronthaul communication system.

FIG. 1 is a schematic diagram of a C-RAN system 100. The system 100 comprises an RRU 110 communicatively coupled to a BBU pool 120 through a fronthaul link 130. The RRU 110 is located at a remote cell site 140. The RRU 110 is typically installed at the bottom of a cell tower 141 that holds a plurality of antennas 142. The fronthaul link 130 is a cable link, a free-space link, or an optical fiber link configured to transport digital baseband signals between the RRU 110 and the BBU pool 120. A cable link comprises coaxial cables. A free-space link comprises a line-of-sight radio wave propagation path. An optical fiber link comprises a standard single-mode fiber (SSMF) or a multi-mode fiber (MMF). Since optical fibers provide significantly lower power loss, higher speed, and higher BW than cables, optical fibers are commonly employed for the fronthaul link 130 instead of cables. The BBU pool 120 is typically located at a CO site 170. The cell site 140 is a geographical area located at a remote location away from the CO site 170 and may comprise one or more cell sectors, which may be determined during network deployment by mobile operators. The RRU 110 serves a plurality of mobile stations located in the cell site 140. The BBU pool 120 connects the RRU 110 to a core network 150 via a backhaul link 160. The backhaul link 160 is substantially similar to the fronthaul link 130, but transports packets such as Ethernet packets between the BBU pool 120 and the core network 150. The core network 150 may comprise interconnected sub-networks operated by network providers and service providers. The core network 150 is a central part of a network that provides network services to the users of the mobile stations.

The RRU 110 is communicatively coupled to the antennas 142. The RRU 110 is a device configured to communicate with the mobile stations in designated wireless UL RF channels and designated wireless DL RF channels via the antennas 142. UL refers to the transmission direction from mobile stations towards a CO or a CO site 170, whereas DL refers to the transmission direction from the CO or the CO site 170 towards the mobile stations. Some examples of wireless RF channels include LTE channels, LTE-advanced (LTE-A) channels, or other evolved universal terrestrial radio access (E-UTRA) channels as defined in third generation partnership project (3GPP) specifications.

The BBU pool 120 comprises a plurality of BBUs 121. The BBUs 121 are devices configured to perform BB digital signal processing (DSP) functions and wireless media access control (MAC) processing functions according to a wireless communication protocol.

In a UL direction, the RRU 110 receives UL RF signals from the mobile stations, down converted to baseband signal, and aggregates the UL BB signals into an aggregated UL signal, and sends the aggregated UL signal to the BBU pool 120 via the fronthaul link 130. When a BBU 121 receives the aggregated UL signal from the RRU 110, the BBU 121 deaggregates the aggregated UL signal and performs BB processing and MAC processing on the deaggregated UL signals to recover the UL data transmitted by the mobile stations. The BBU 121 forwards the data to the core network 150. The BBUs 121 may coordinate with each other to jointly process one or more UL aggregated signals from one or more RRUs. The aggregation and deaggregation of the UL signals may be performed in a BB or an intermediate frequency (IF), as described more fully below.

In a DL direction, the core network 150 forwards DL data packets to the BBU pool 120 over the backhaul link 160. The DL data packets are destined to the mobile stations. The BBUs 121 generate DL signals for the mobile stations from corresponding DL data packets by performing BB processing and MAC processing. The BBUs 121 aggregate the DL signals into aggregated DL signals and transmit the aggregated DL signals to the RRU 110 via the fronthaul link 130. When the RRU 110 receives an aggregated DL signal from the BBU 121, the RRU 110 deaggregates the aggregated DL signal and transmits the deaggregated DL signals to the mobile stations in corresponding DL RF channels. The aggregation and deaggregation of the DL signals are similar to the aggregation and deaggregation of the UL signals, as described more fully below.

U.S. patent application Ser. No. 14/528,823 by Xiang Liu, et al., and titled "Aggregated Touchless Wireless Fronthaul," ('823 Application), which is incorporated by reference, describes an efficient wireless fronthaul system that digitally aggregates and deaggregates UL and DL signals in a BB or an IF by employing frequency-division multiplexing (FDM) and transports the digitized UL and DL BB signals over a fronthaul link such as the fronthaul link 130. The efficient wireless fronthaul system employs intensity modulation (IM) for optical transmission and direct-detection (DD) for optical reception.

Figure 2:
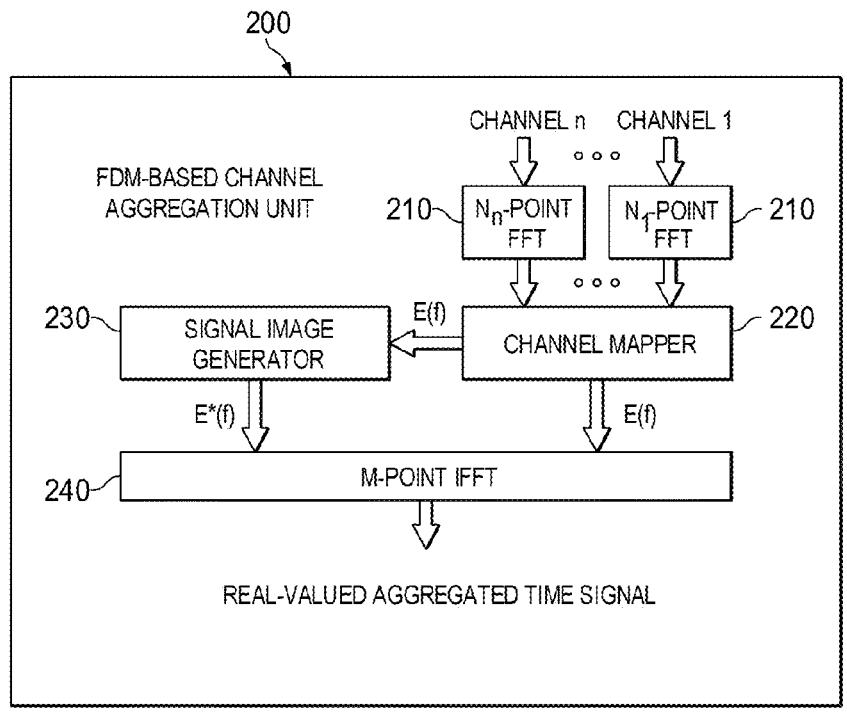
FIG. 2 is a schematic diagram of a FDM-based domain channel aggregation unit.

FIG. 2 is a schematic diagram of an FDM-based channel aggregation unit 200. The FDM-based channel aggregation unit 200 is described in the '823 Application. The FDM-based channel aggregation unit 200 is employed by the RRU 110 and the BBUs 121. When the FDM-based channel aggregation unit 200 is employed at the RRU 110, the FDM-based channel aggregation unit 200 receives UL BB or IF signals corresponding to UL RF signals transmitted by mobile stations. When the FDM-based channel aggregation unit 200 is employed at the BBUs 121, the FDM-based channel aggregation unit 200 receives DL BB or intermediate band (IB) signals carrying DL packets generated by a core network such as the core network 150. The RRU 110 and the BBUs 121 employ an optical frontend to convert the output of the digital channel aggregation unit 200 into an optical signal and transmit the optical signal over the fronthaul link 130. The FDM-based channel aggregation unit 200 comprises a plurality of FFT units 210, a channel mapper 220, a signal image generator 230, and an IFFT unit 240.

The FFT units 210 are configured to transform input signals from a time domain into a frequency domain. Each FFT unit 210 operates on an input signal corresponding to a particular wireless RF channel, shown as channel 1 to channel n, which may comprise any suitable channel configuration. Each FFT unit 210 is configured to perform an $N_i$-point FFT, where $N_i$ is a positive integer corresponding to the FFT size. It should be noted that the FFT units 210 may perform discrete Fourier transform (DFT) instead of FFT to transform time-domain signals into frequency-domain signals.

The channel mapper 220 is coupled to the FFT units 210 and configured to map the frequency signals produced by the FFT units 210 to adjacent non-overlapping frequency bands or FFT bins according to a pre-determined channel map to produce an aggregated frequency signal, denoted as E(f). The aggregated frequency signal E(f) spans a positive frequency band between $f_{DC}$ and $f_{MAX}$, where $f_{DC}$ corresponds to the frequency bin number 0 at direct current frequency 0 Hz and $f_{MAX}$ corresponds to frequency bin number $$\frac{M}{2} + 1,$$

where M is a positive integer. The mapping of the frequency signals in a frequency domain is also referred to as FDM.

The signal image generator 230 is coupled to the channel mapper 220 and configured to generate an image signal, E*(f), that is a complex conjugate of the signal E(f). For example, the signal E*(f) spans a negative frequency band between $f_{DC}$ and $f_{MIN}$, where $f_{MIN}$ corresponds to the frequency bin $$\frac{-M}{2} + 1.$$

Thus, E*(f)=E(−f).

The IFFT unit 240 is coupled to the channel mapper 220 and the signal image generator 230 and configured to perform an M-point IFFT, where M is the IFFT size of the IFFT unit 240 and corresponds to the number of frequency bins output by the channel mapper 220. The FFT size of the FFT units 210 and the IFFT size of the IFFT unit 240 are determined based on the sampling rates, the channel BWs of the input signals at the FFT units 210, and the number of signals for aggregation. The employment of the signal image generator 230 provides FFT symmetry or Hermitian symmetry. Thus, the output of the IFFT unit 240 is a real-valued aggregated time signal carrying an aggregation of the input signals. Subsequently, an overlap-save (OS) approach may be applied to combine successive real-valued time-domain signals generated by the IFFT unit 240. It should be noted that the IFFT unit 240 may perform inverse DFT (IDFT) instead of IFFT to transform frequency-domain signals into time-domain signals.

Figure 3:
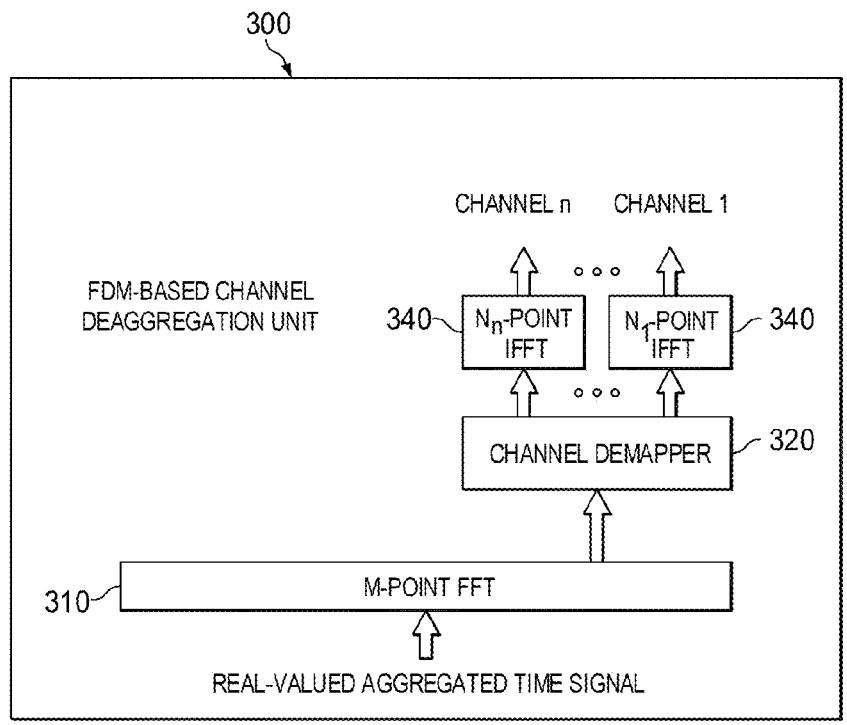
FIG. 3 is a schematic diagram of an FDM-based channel deaggregation unit.

FIG. 3 is a schematic diagram of an embodiment of an FDM-based channel deaggregation unit 300. The FDM-based channel deaggregation unit 300 is described in the '823 Application. The FDM-based channel deaggregation unit 300 is employed by the RRU 110 and the BBUs 121. The FDM-based channel deaggregation unit 300 operates on aggregated signals received from a fronthaul link such as the fronthaul link 130. When the FDM-based channel deaggregation unit 300 is employed at the RRU 110, the aggregated signals carry DL BB or IF signals that are destined for mobile stations. When the FDM-based channel deaggregation unit 300 is employed at the BBUs 121, the received aggregated signals carry UL BB or IF signals corresponding to UL RF signals transmitted by the mobile stations. The FDM-based channel deaggregation unit 300 comprises an FFT unit 310, a channel demapper 320, and a plurality of IFFT units 340.

The FFT unit 310 is similar to the FFT unit 210 and is configured to perform an M-point FFT to convert a real-valued aggregated time signal from a time domain to a frequency domain to produce a frequency signal. The real-valued aggregated time signal is similar to the output of the FDM-based channel aggregation unit 200. The channel demapper 320 is coupled to the FFT unit 310 and configured to demultiplex the frequency signal at the positive frequency band, between $f_{DC}$ and $f_{MAX}$, into a plurality of frequency signals, each corresponding to a particular wireless channel, shown as channel 1 to channel n, according to a predetermined channel map. The demultiplexing of the frequency signal in a frequency domain is also referred to as frequency-division demultiplexing. The portion of the frequency signal located at the negative frequency band between $f_{DC}$ and $f_{MIN}$ may be discarded. The IFFT units 340 are similar to the IFFT unit 240 and are configured to perform an $N_t$-point IFFT. Subsequently, an OS approach may be applied to combine successive real-valued time-domain signals generated by each IFFT unit 340.

Although the FDM-based channel aggregation and deaggregation scheme described in the FDM-based channel aggregation unit 200 and the FDM-based channel deaggregation unit 300 provide low latency, high-bandwidth efficiency, and high throughput, the FDM-based channel aggregation and deaggregation scheme requires a large-size FFT to achieve sufficient performance for wireless fronthaul applications. For example, the FFT units 210 perform 64-point FFT and the IFFT unit 240 performs an 8192-point IFFT for aggregation, and the IFFT units 340 perform 64-point IFFT and the FFT unit 310 performs an 8192-point FFT for deaggregation. The large FFT/IFFT size leads to high latency and high computational complexity. For example, the latency for an 8192-point FFT at 4 gigasamples per second (GS/s) is at least about 2 microseconds (µs). In addition, the FDM-based channel aggregation and deaggregation scheme produces signals with large passband ripples, which may degrade passband SNRs.

Disclosed herein are embodiments for providing a computationally efficient digital channel aggregation and deaggregation scheme suitable for use in wireless fronthaul communication systems. The disclosed embodiments employ an FDW scheme, an FS scheme, and a TDW scheme to reduce computational complexity and improve performance. In the FDW scheme, FDW is applied to wireless channel signals in a frequency domain to enable significant FFT and IFFT size reduction (e.g., about 4 times) with about the same performance as a large size FFT/IFFT. In addition, the FDW scheme reduces SNR variations across frequencies or ripples in passband SNRs. In the FS scheme, FS is applied to wireless channel signals in a time domain to provide a half frequency sample shift in DFT. The output of a half sample frequency-shifted N-point DFT comprises N/2 frequency sample points in positive frequencies and N/2 frequency sample points in negative frequencies. In the TDW scheme, TDW is applied to further reduce ripples in passband SNRs. The FDW scheme, the FS scheme, and the TDW scheme may be employed separately or in conjunction with each other. In addition to computational complexity reduction and performance improvement, the disclosed embodiments reduce latency, cost, and power consumption in wireless fronthaul communication systems. The FDW scheme, the FS scheme, and the TDW scheme are suitable for FDM-based channel aggregation and deaggregation. In addition, the FDW scheme is suitable for TDM-based channel aggregation and deaggregation. Although the disclosed embodiments are described in the context of wireless fronthaul communication systems, the disclosed embodiments are suitable for use in any type of fronthaul communication system.

Figure 4:
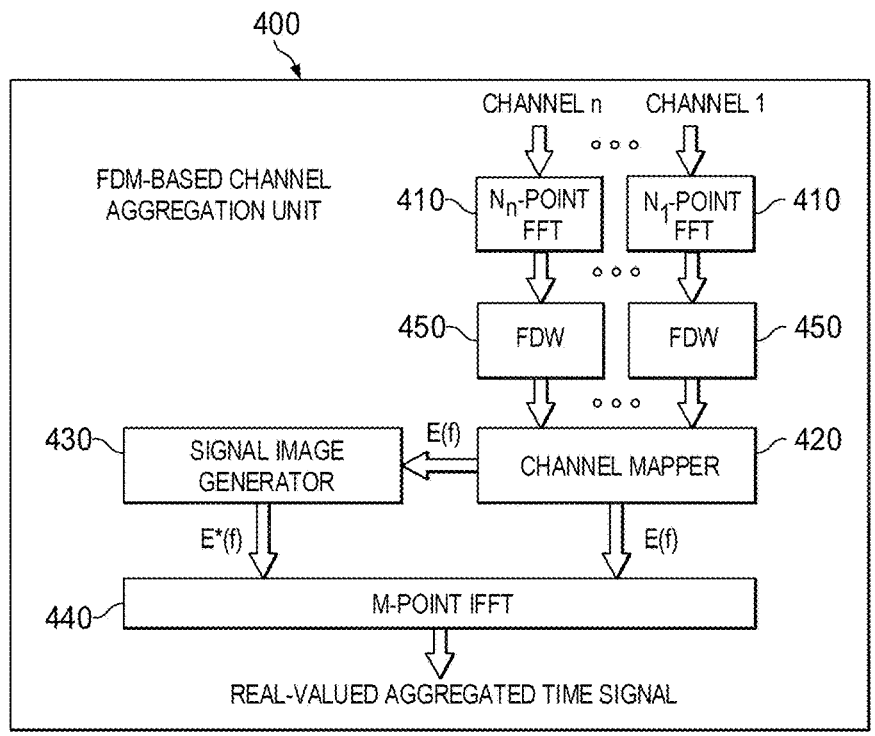
FIG. 4 is a schematic diagram of an FDM-based channel aggregation unit that performs FDW according to an embodiment of the disclosure.

FIG. 4 is a schematic diagram of an FDM-based channel aggregation unit 400 that performs FDW according to an embodiment of the disclosure. The FDM-based channel aggregation unit 400 is employed by the RRU 110 and the BBUs 121. The FDM-based channel aggregation unit 400 may be implemented via software, hardware, or combinations thereof. The FDM-based channel aggregation unit 400 is similar to the FDM-based channel aggregation unit 200, but performs FDW to reduce FFT size without degrading performance. The employment of a smaller FFT size reduces latency, computational complexity, and power consumption. The FDM-based channel aggregation unit 400 comprises a plurality of FFT units 410, a channel mapper 420, a signal image generator 430, an IFFT unit 440, and a plurality of FDW units 450. The FFT units 410 are similar to the FFT units 210 and 310. The channel mapper 420 is similar to the channel mapper 220. The signal image generator 430 is similar to the signal image generator 230. The IFFT unit 440 is similar to the IFFT units 240 and 340.

The FDW units 450 are positioned between the outputs of the FFT units 210 and the input of the channel mapper 420. The FDW units 450 are configured to receive frequency signals from the FFT units 410 and apply FDW to the frequency signals. The frequency signals correspond to channel signals of wireless RF channels, shown as channel 1 to channel n. Each FDW unit 450 applies FDW by multiplying a corresponding frequency signal by an FDW function. The FDW function comprises a sequence of FDW coefficients. The application of FDW reduces spectral leakage, and thus allowing the employment of a smaller FFT size without increasing distortions. For example, by employing FDW, the FFT units 410 are configured to perform 16-point FFTs instead of 64-point FFTs as required by the FDM-based channel aggregation unit 200 to achieve sufficient performance. When the FFT size is reduced to 16, the IFFT unit 440 is configured to perform a 2048-point IFFT instead of an 8192-point IFFT to maintain the same number of aggregated channels as in the FDM-based channel aggregation unit 200. Thus, the computational complexity may be reduced by about 4 times.

The RF wireless channel signals are typically spectrally-shaped to confine the signal spectra with certain spectral roll-offs in the frequency domain. Spectral-shaping may be achieved through various mechanisms such as oversampling, partial-response, pre-filtering, and any other suitable pre-conditioning function. Thus, the FDW function or the FDW coefficients may be configured to match the spectral shape of a corresponding input channel signal to further improve performance. For example, the FDW coefficients of an FDW function are selected to match the spectral roll-offs of a corresponding input channel signal to reduce spectral noise. One approach to determining the FDW coefficients is to perform an exhaustive search through numerical simulations. The following shows an example FDW function suitable for a 20 megahertz (MHz) LTE channel signal with a 16-point FFT:

$$P\_window=[0.44\ 0.66\ 0.94\ 1\ 1\ 1\ 1\ 1\ 1\ 1\ 1\ 1\ 0.94\ 0.66\ 0.44], \quad (1)$$

where P_window represents the FDW function. As shown, the FDW function, P_window, comprises an even number of FDW coefficients, where the first half of the FDW coefficients is symmetrical to the second half of the FDW coefficients.

In an embodiment, the FDW units 450 are configured with a plurality of FDW functions, each corresponding to a particular type of signal, such as a 5 MHz LTE signal, a 10 MHz LTE signal, and a 20 MHz LTE signal. In such an embodiment, the FDW unit 450 selects an FDW function according to the signal type of the input channel signal.

Figure 5:
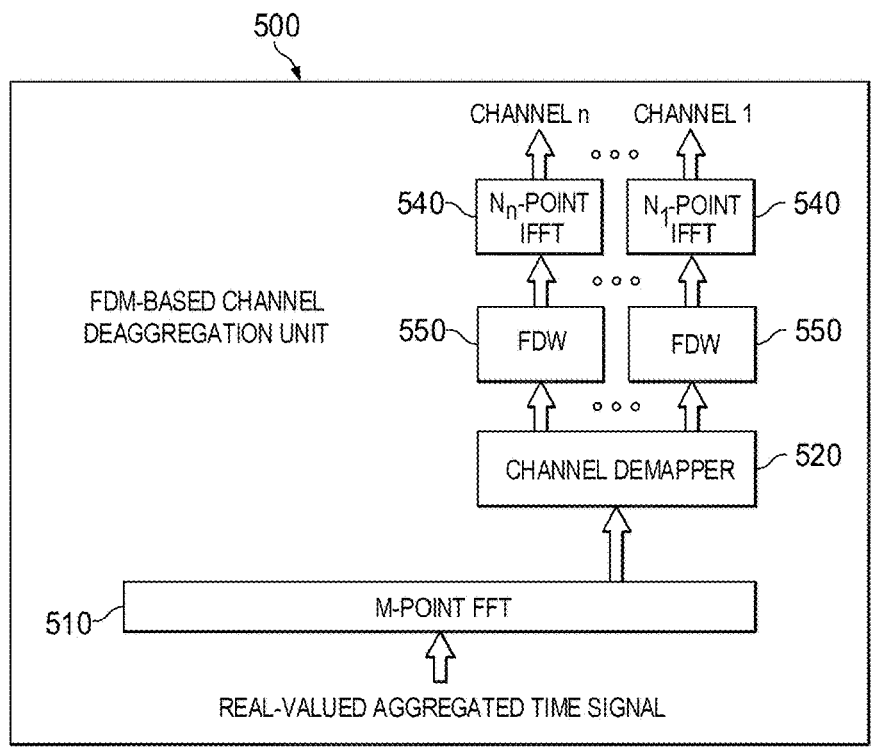
FIG. 5 is a schematic diagram of an FDM-based channel deaggregation unit that performs FDW according to an embodiment of the disclosure.

FIG. 5 is a schematic diagram of an FDM-based channel deaggregation unit 500 that performs FDW according to an embodiment of the disclosure. The FDM-based channel deaggregation unit 500 is employed by the RRU 110 and the BBUs 121. For example, an RRU or a BBU may employ the FDM-based channel deaggregation unit 500 in conjunction with the FDM-based channel aggregation unit 400. The FDM-based channel deaggregation unit 500 may be implemented via software, hardware, or combinations thereof. The FDM-based channel deaggregation unit 500 is similar to the FDM-based channel deaggregation unit 300, but performs FDW to reduce FFT size without degrading performance. The FDM-based channel deaggregation unit 500 comprises an FFT unit 510, a channel demapper 520, a plurality of IFFT units 540, and a plurality of FDW units 550. The FFT unit 510 is similar to the FFT units 210, 310, and 410. The channel demapper 520 is similar to the channel demapper 320. The IFFT units 540 are similar to the IFFT units 240, 340, and 440.

The FDW units 550 are positioned between the output of the channel demapper 520 and the inputs of the IFFT units 540. The FDW units 550 are similar to the FDW units 450, but operate on different signals. In one embodiment, the FDW units 550 are configured with the same FDW function as the FDW units 450. In another embodiment, the FDW units 550 are configured with a rectangular window function or another suitable windowing function. Each FDW unit 450 receives a deaggregated or demultiplexed channel signal in a frequency domain from the channel demapper 520 and applies FDW to the deaggregated or demultiplexed channel signal. Similar to the FDM-based channel aggregation unit 400, the application of FDW enables the FFT unit 510 to implement a 2048-point FFT instead of an 8192-point FFT and the IFFT units 540 to implement 16-point IFFTs instead of 64-point IFFTs.

Figure 6:
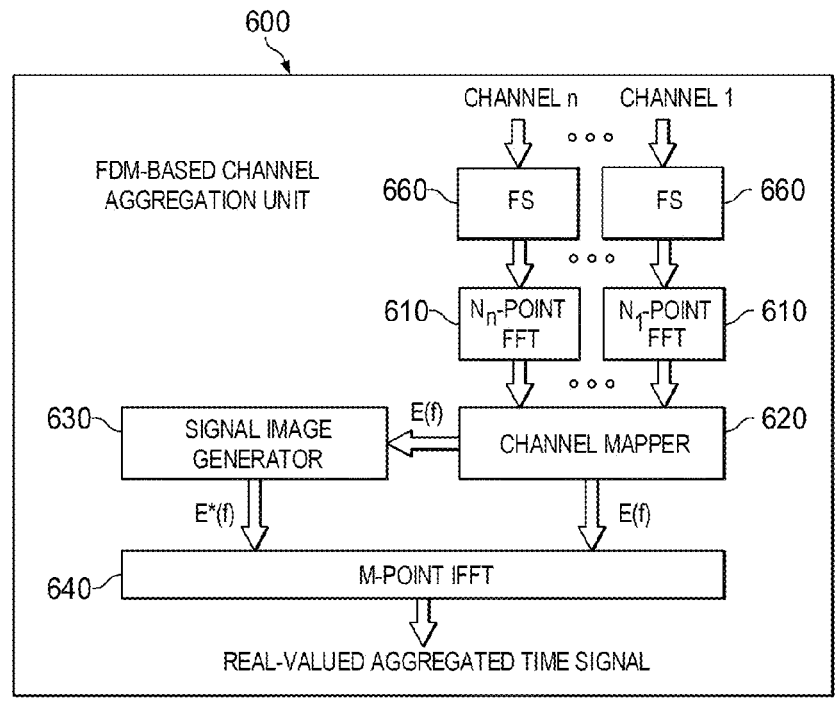
FIG. 6 is a schematic diagram of an FDM-based channel aggregation unit that performs FS according to an embodiment of the disclosure.

FIG. 6 is a schematic diagram of an FDM-based channel aggregation unit 600 that performs FS according to an embodiment of the disclosure. The FDM-based channel aggregation unit 600 is employed by the RRU 110 and the BBUs 121. The FDM-based channel aggregation unit 600 may be implemented via software, hardware, or combinations thereof. The FDM-based channel aggregation unit 600 is similar to the FDM-based channel aggregation unit 200, but performs FS to compensate frequency offset caused by the asymmetry property of FFT/IFFT. The asymmetry property refers to the asymmetrical output of an FFT or an IFFT. For example, an FFT output comprises asymmetric positive and negative frequency components. The FDM-based channel aggregation unit 600 comprises a plurality of FFT units 610, a channel mapper 620, a signal image generator 630, an IFFT unit 640, and a plurality of FS units 660. The FFT units 610 are similar to the FFT units 210, 310, 410, and 510. The channel mapper 620 is similar to the channel mappers 220 and 420. The signal image generator 630 is similar to the signal image generators 230 and 430. The IFFT unit 640 is similar to the IFFT units 240, 340, 440, and 540.

The FS units 660 are positioned at the inputs of the FFT units 610. The FS units 660 are configured to receive channel signals of wireless RF channels, shown as channel 1 to channel n, in a time domain and perform FS on the channel signals. Each FS unit 660 applies FS by rotating the phases of the channel signal time-domain samples, where each channel signal is multiplied by a first FS function shown below:

$$FS1(k) = \exp^{\frac{-j \times 2 \times \pi \times k}{2K}}, \quad (2)$$

where FS1(k) represents the FS function, exp represents an exponential function, j represents the square root of minus one, k represents a time sample index in a time frame of K number of time samples, π represents the value 3.14159, which is a constant ratio between a circle's circumference to a circle's diameter, and K corresponds to the FFT size of a corresponding FFT unit 610. For example, when a corresponding FFT unit 610 is configured to perform a 16-point FFT, K is set to a value of 16. It should be noted that FS may improve the performance and effectiveness of FDW when employed in conjunction with FDW, as described more fully below.

Figure 7:
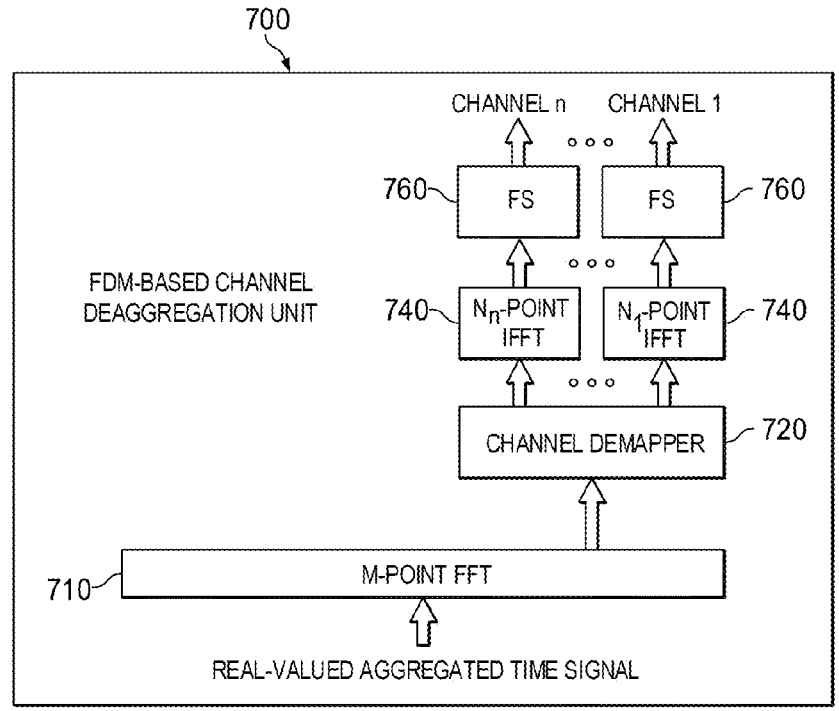
FIG. 7 is a schematic diagram of an FDM-based channel deaggregation unit that performs FS according to an embodiment of the disclosure.

FIG. 7 is a schematic diagram of an FDM-based channel deaggregation unit 700 that performs FS according to an embodiment of the disclosure. The FDM-based channel deaggregation unit 700 is employed by the RRU 110 and the BBUs 121. For example, an RRU or a BBU may employ the FDM-based channel deaggregation unit 700 in conjunction with the FDM-based channel aggregation unit 600. The FDM-based channel deaggregation unit 700 may be implemented via software, hardware, or combinations thereof. The FDM-based channel deaggregation unit 700 is similar to the FDM-based channel deaggregation unit 300, but performs additional FS to compensate frequency offset caused by the asymmetry property of FFT/IFFT. The FDM-based channel deaggregation unit 700 comprises an FFT unit 710, a channel demapper 720, a plurality of IFFT units 740, and a plurality of FS units 760. The FFT unit 710 is similar to the FFT units 210, 310, 410, 510, and 610. The channel demapper 720 is similar to the channel demapper 320 and 520. The IFFT units 740 are similar to the IFFT units 240, 340, 440, 540, and 640.

The FS units 760 are positioned at the outputs of the IFFT units 740. The FS units 760 perform opposite operation as the FS units 660 and operate on different signals. Each FS unit 760 receives a deaggregated or demultiplexed channel signal in a time domain from a corresponding IFFT unit 740 and applies FS to the deaggregated or demultiplexed channel signal by multiplying the deaggregated or demultiplexed channel signal by a second FS function as shown below:

$$FS2(k) = \exp^{\frac{j \times 2 \times \pi \times k}{2K}}, \quad (3)$$

where FS2(k) represents the second FS function, exp represents an exponential function, j represents the square root of minus one, π represents the value 3.14159, k represents a time sample index in a time frame of K number of time samples, and K corresponds to the IFFT size of a corresponding IFFT unit 740. For example, when a corresponding IFFT unit 740 is configured to perform a 16-point IFFT, K is set to a value of 16.

Figure 8:
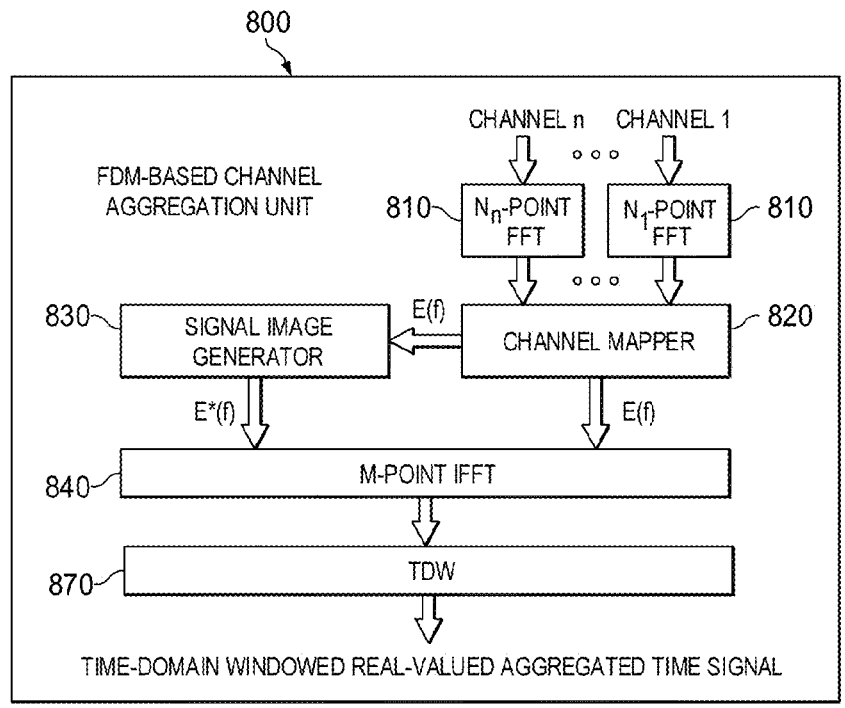
FIG. 8 is a schematic diagram of an FDM-based channel aggregation unit that performs TDW according to an embodiment of the disclosure.

FIG. 8 is a schematic diagram of an FDM-based channel aggregation unit 800 that performs TDW according to an embodiment of the disclosure. The FDM-based channel aggregation unit 800 is employed by the RRU 110 and the BBUs 121. The FDM-based channel aggregation unit 800 may be implemented via software, hardware, or combinations thereof. The FDM-based channel aggregation unit 800 is similar to the FDM-based channel aggregation unit 200, but performs TDW to reduce ripples or variations in passband SNRs. The FDM-based channel aggregation unit 800 comprises a plurality of FFT units 810, a channel mapper 820, a signal image generator 830, an IFFT unit 840, and a TDW unit 870. The FFT units 810 are similar to the FFT units 210, 310, 410, 510, 610, and 710. The channel mapper 820 is similar to the channel mappers 220, 420, and 620. The signal image generator 830 is similar to the signal image generators 230, 430, and 630. The IFFT unit 840 is similar to the IFFT units 240, 340, 440, 540, 640, and 740.

The TDW unit 870 is positioned at the output of the IFFT unit 840. The TDW unit 870 is configured to receive an aggregated channel signal from the IFFT unit 840 and applies TDW to the aggregated channel signal. The aggregated channel signal comprises an aggregation of a plurality of channel signals corresponding to wireless RF channels, shown as channel 1 to channel n. To perform TDW, the TDW unit 870 multiples the aggregated channel signal by a TDW function such as a Hamming window, a triangular window, and the like. The application of TDW provides smoother transitions between successive signal frames in the time domain and reduces passband ripples in the frequency domain. Subsequently, an OS approach may be applied to combine successive time-domain windowed signals generated by the TDW unit 870.

Figure 9:
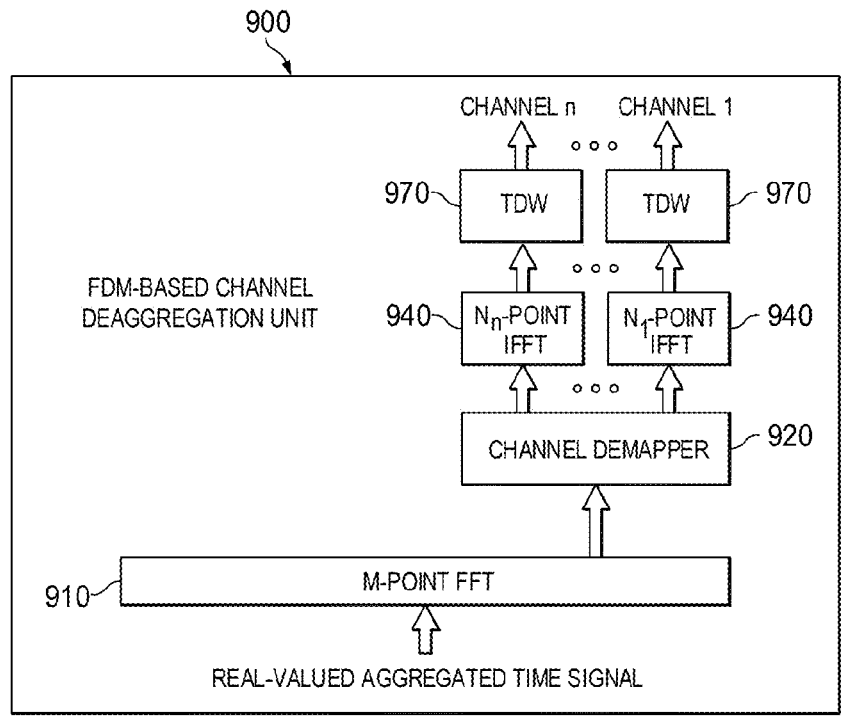
FIG. 9 is a schematic diagram of an FDM-based channel deaggregation unit that performs TDW according to an embodiment of the disclosure.

FIG. 9 is a schematic diagram of an FDM-based channel deaggregation unit 900 that performs TDW according to an embodiment of the disclosure. The FDM-based channel deaggregation unit 900 is employed by the RRU 110 and the BBUs 121. For example, an RRU or a BBU may employ the FDM-based channel deaggregation unit 900 in conjunction with the FDM-based channel aggregation unit 800. The FDM-based channel deaggregation unit 900 may be implemented via software, hardware, or combinations thereof. The FDM-based channel deaggregation unit 900 is similar to the FDM-based channel deaggregation unit 300, but performs TDW to reduce passband SNR ripples or fluctuations. The FDM-based channel deaggregation unit 900 comprises an FFT unit 910, a channel demapper 920, a plurality of IFFT units 940, and a plurality of TDW units 970. The FFT unit 910 is similar to the FFT units 210, 310, 410, 510, 610, 710, and 810. The channel demapper 920 is similar to the channel demapper 320, 520, and 720. The IFFT units 940 are similar to the IFFT units 240, 340, 440, 540, 640, 740, and 840.

The TDW units 970 are positioned at the outputs of the IFFT units 940. The TDW units 970 are similar to the TDW unit 870. Each TDW unit receives a deaggregated or demultiplexed channel signal in a time domain from a corresponding IFFT unit 940 and applies TDW to the deaggregated or demultiplexed channel signal by multiplying the deaggregated or demultiplexed signal by a TDW function. Subsequently, an OS approach may be applied to combine successive time-domain windowed signals at the output of each TDW unit 970.

Figure 10:
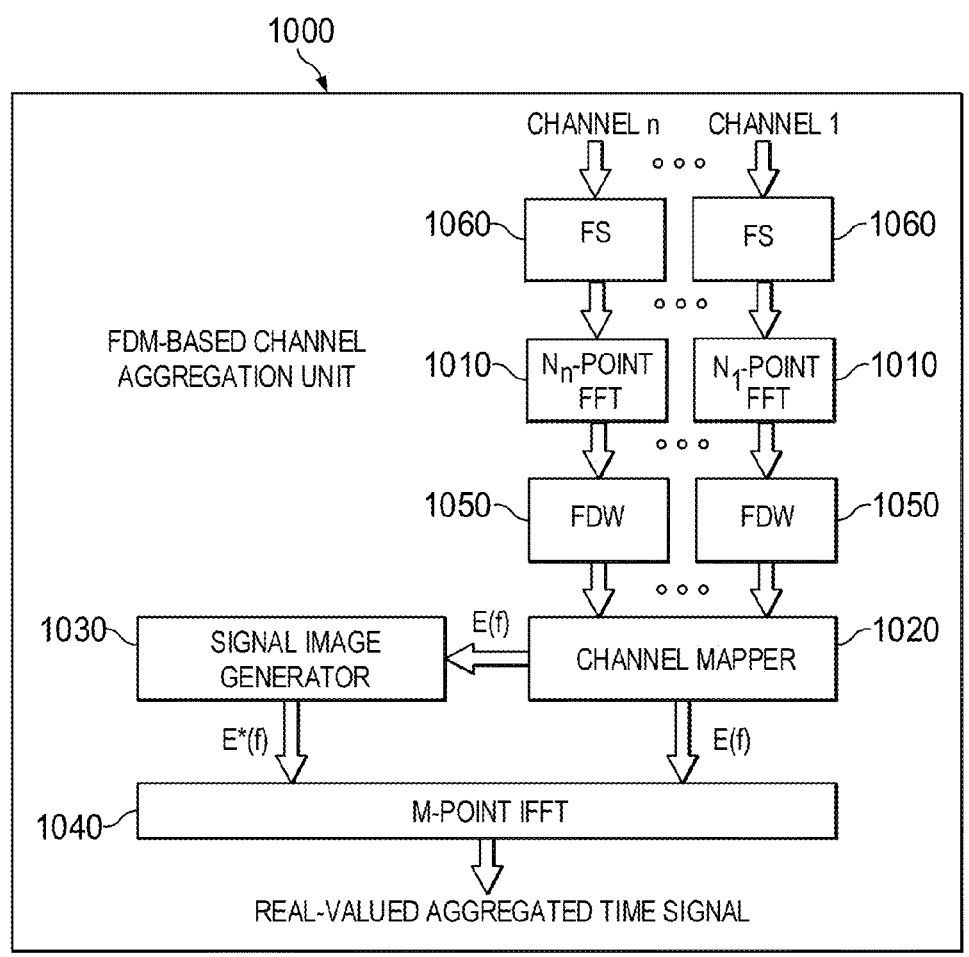
FIG. 10 is a schematic diagram of an FDM-based channel aggregation unit that performs FDW and FS according to an embodiment of the disclosure.

FIG. 10 is a schematic diagram of an FDM-based channel aggregation unit 1000 that performs FDW and FS according to an embodiment of the disclosure. The FDM-based channel aggregation unit 1000 is employed by the RRU 110 and the BBUs 121. The FDM-based channel aggregation unit 1000 may be implemented via software, hardware, or combinations thereof. The FDM-based channel aggregation unit 1000 is similar to the FDM-based channel aggregation unit 200, but performs FDW and FS to reduce FFT size and compensate frequency offset, respectively. The FDM-based channel aggregation unit 1000 comprises a plurality of FFT units 1010, a channel mapper 1020, a signal image generator 1030, an IFFT unit 1040, a plurality of FDW units 1050, and a plurality of FS units 1060. The FFT units 1010 are similar to the FFT units 210, 310, 410, 510, 610, 710, 810, and 910. The channel mapper 1020 is similar to the channel mappers 220, 420, 620, and 820. The signal image generator 1030 is similar to the signal image generators 230, 430, 630, and 830. The IFFT unit 1040 is similar to the IFFT units 240, 340, 440, 540, 640, 740, 840, and 940. The FDW units 1050 are similar to the FDW units 450 and 550. Similar to the FDM-based channel aggregation unit 400, the FDW units 1050 are positioned between the outputs of the FFT units 1010 and the input of the channel mapper 1020. The FS units 1060 are similar to the FS units 660 and 760. Similar to the FDM-based channel aggregation unit 600, the FS units 1060 are positioned at the inputs of the FFT units 1010.

As shown above in equation (1), an FDW function comprises an even number of FDW coefficients, where the first half of the FDW coefficients is symmetrical to the second half of the FDW coefficients. However, each FFT output comprises a direct current (DC) component, positive frequency sample points, a Nyquist component at half sample frequency, and negative frequency sample points. The application of FS rotates or shifts the FFT outputs such that the FFT outputs are symmetrical at 0 hertz (Hz). As such, the combination of FDW and FS produces symmetrical positive frequency components and negative frequency components, thus providing symmetrical performance for both positive frequencies and negative frequencies, as described more fully below.

Figure 11:
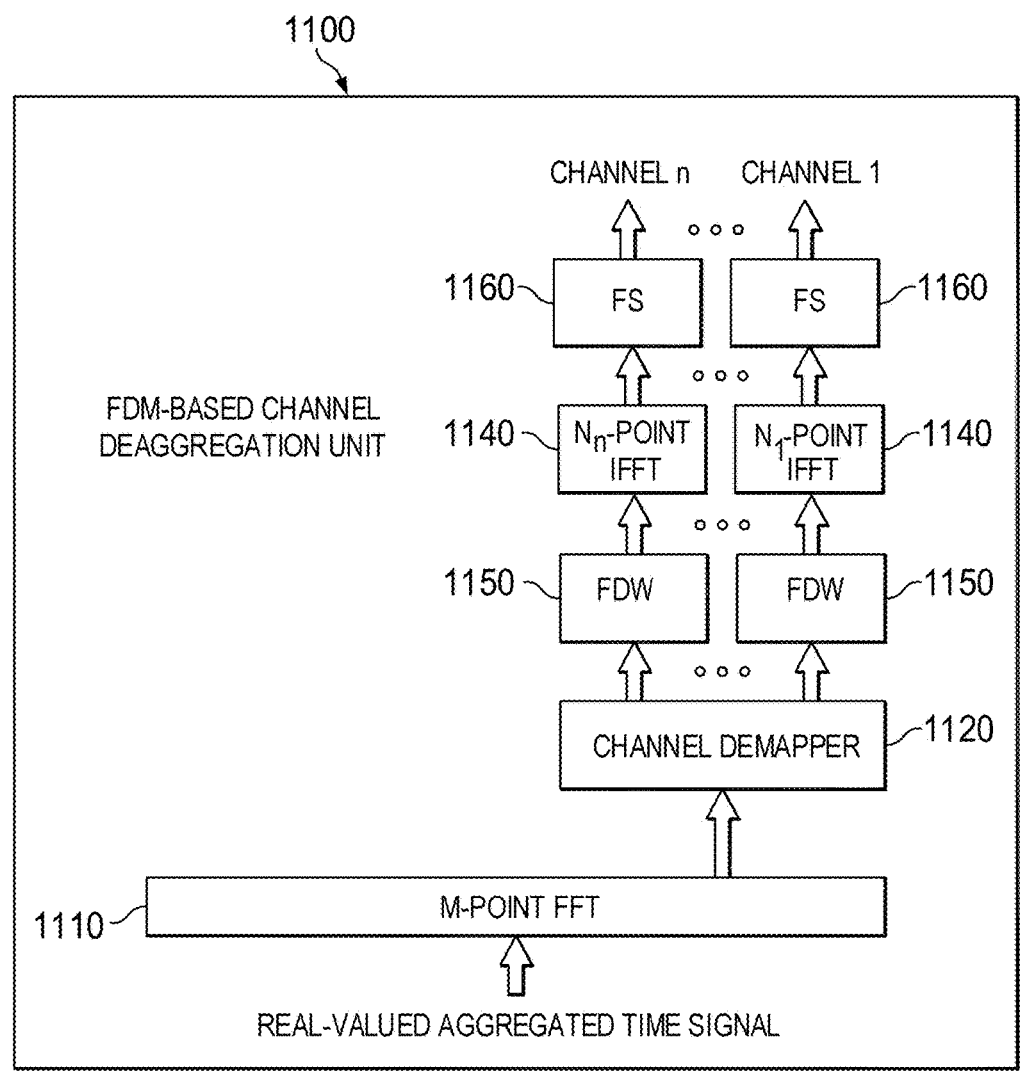
FIG. 11 is a schematic diagram of an FDM-based channel deaggregation unit that performs FDW and FS according to an embodiment of the disclosure.

FIG. 11 is a schematic diagram of an FDM-based channel deaggregation unit 1100 that performs FDW and FS according to an embodiment of the disclosure. The FDM-based channel deaggregation unit 1100 is employed by the RRU 110 and the BBUs 121. For example, an RRU or a BBU may employ the FDM-based channel deaggregation unit 1100 in conjunction with the FDM-based channel aggregation unit 1000. The FDM-based channel deaggregation unit 1100 may be implemented via software, hardware, or combinations thereof. The FDM-based channel deaggregation unit 1100 is similar to the FDM-based channel deaggregation unit 300, but performs FDW and FS to reduce FFT size and compensate frequency offset, respectively. The FDM-based channel deaggregation unit 1100 comprises an FFT unit 1110, a channel demapper 1120, a plurality of IFFT units 1140, a plurality of FDW units 1150, and a plurality of FS units 1160. The FFT unit 1110 is similar to the FFT units 210, 310, 410, 510, 610, 710, 810, 910, and 1010. The channel demapper 1120 is similar to the channel demappers 320, 520, 720, and 920. The IFFT units 1140 are similar to the IFFT units 240, 340, 440, 540, 640, 740, 840, 940, and 1040. The FDW units 1150 are similar to the FDW units 450, 550, and 1050. Similar to the FDM-based channel deaggregation unit 500, the FDW units 1150 are positioned between the output of the channel demapper 1120 and the inputs of the IFFT units 1140. The FS units 1060 are similar to the FS units 660, 760, and 1060. Similar to the FDM-based channel deaggregation unit 700, the FS units 1060 are positioned at the outputs of the IFFT units 1140. The employment of FDW in conjunction with FS improves channel deaggregation performance, as described more fully below.

Figure 12:
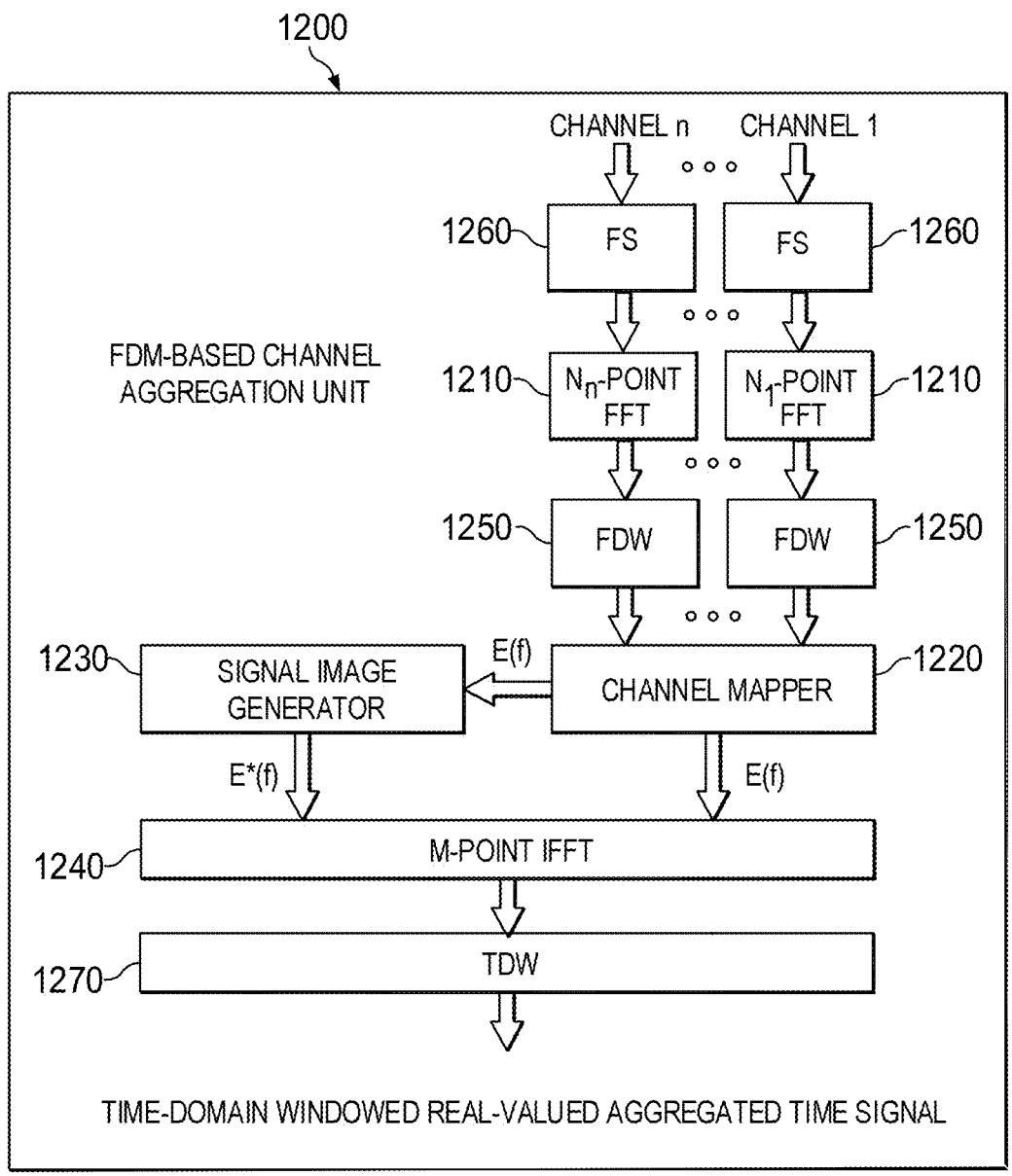
FIG. 12 is a schematic diagram of an FDM-based channel aggregation unit that performs FDW, FS, and TDW according to an embodiment of the disclosure.

FIG. 12 is a schematic diagram of an FDM-based channel aggregation unit 1200 that performs FDW, FS, and TDW according to an embodiment of the disclosure. The FDM-based channel aggregation unit 1200 is employed by the RRU 110 and the BBUs 121. The FDM-based channel aggregation unit 1200 may be implemented via software, hardware, or combinations thereof. The FDM-based channel aggregation unit 1200 is similar to the FDM-based channel aggregation unit 200, but performs FDW, FS, and TDW to reduce FFT size, compensate frequency offset, and reduce SNR fluctuations, respectively. The FDM-based channel aggregation unit 1200 comprises a plurality of FFT units 1210, a channel mapper 1220, a signal image generator 1230, an IFFT unit 1240, a plurality of FDW units 1250, a plurality of FS units 1260, and a TDW unit 1270. The FFT units 1210 are similar to the FFT units 210, 310, 410, 510, 610, 710, 810, 910, 1010, and 1110. The channel mapper 1220 is similar to the channel mappers 220, 420, 620, 820, and 1020. The signal image generator 1230 is similar to the signal image generators 230, 430, 630, 830, and 1030. The IFFT unit 1240 is similar to the IFFT units 240, 340, 440, 540, 640, 740, 840, 940, 1040, and 1140. The FDW units 1250 are similar to the FDW units 450, 550, and 1050. Similar to the FDM-based channel aggregation units 400 and 1000, the FDW units 1250 are positioned between the outputs of the FFT units 1210 and the input of the channel mapper 1220. The FS units 1260 are similar to the FS units 660, 760, and 1060. Similar to the FDM-based channel aggregation units 600 and 1000, the FS units 1260 are positioned at the inputs of the FFT units 1210. The TDW unit 1270 is similar to the TDW unit 870. Similar to the FDM-based channel aggregation unit 800, the TDW unit 1270 is positioned at the output of the IFFT unit 1240. The employment of FDW in conjunction with FS and TDW provides optimum channel aggregation performance, as described more fully below.

Figure 13:
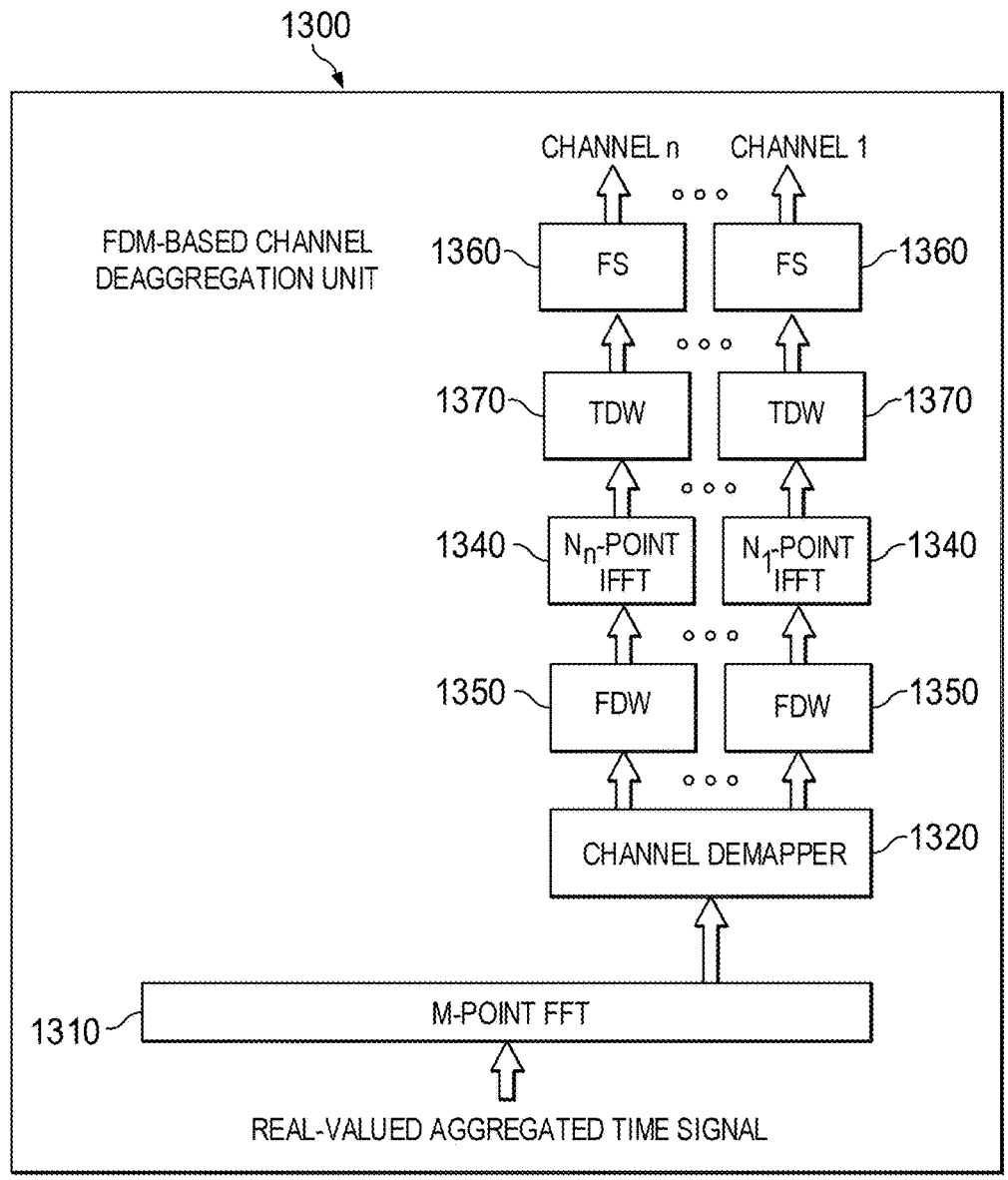
FIG. 13 is a schematic diagram of an FDM-based channel deaggregation unit that performs FDW, FS, and TDW according to an embodiment of the disclosure.

FIG. 13 is a schematic diagram of an FDM-based channel deaggregation unit 1300 that performs both FDW and FS according to an embodiment of the disclosure. The FDM-based channel deaggregation unit 1300 is employed by the RRU 110 and the BBUs 121. For example, an RRU or a BBU may employ the FDM-based channel deaggregation unit 1300 in conjunction with the FDM-based channel aggregation unit 1100. The FDM-based channel deaggregation unit 1300 may be implemented via software, hardware, or combinations thereof. The FDM-based channel deaggregation unit 1300 is similar to the FDM-based channel deaggregation unit 300, but performs FDW, FS, and TDW to reduce FFT size, compensate frequency offset, and reduce passband SNR fluctuations, respectively. The FDM-based channel deaggregation unit 1300 comprises an FFT unit 1310, a channel demapper 1320, a plurality of IFFT units 1340, a plurality of FDW units 1350, a plurality of FS units 1360, and a plurality of TDW units 1370. The FFT unit 1310 is similar to the FFT units 210, 310, 410, 510, 610, 710, 810, 910, 1010, 1110, and 1210. The channel demapper 1320 is similar to the channel demappers 320, 520, 720, 920, and 1120. The IFFT units 1340 are similar to the IFFT units 240, 340, 440, 540, 640, 740, 840, 940, 1040, 1140, and 1240. The FDW units 1350 are similar to the FDW units 450, 550, 1050, and 1150. Similar to the FDM-based channel deaggregation unit 500, the FDW units 1350 are positioned between the output of the channel demapper 1320 and the inputs of the IFFT units 1340. The FS units 1060 are similar to the FS units 660, 760, and 1060. The TDW units 1070 are similar to the TDW units 870, 970, and 1270. Similar to the FDM-based channel deaggregation units 700 and 900, FS and TDW are applied to deaggregated channel signals in a time domain. The TDW units 1370 are coupled to the outputs of the IFFT units 1340. The FS units 1360 are coupled to the outputs of the TDW units 1370. The employment of FDW in conjunction with FS and TDW provides optimum channel deaggregation performance, as described more fully below.

In some embodiments, a wireless fronthaul system such as the system 100 performs TDM-based channel aggregation and deaggregation instead of FDM-based channel aggregation and deaggregation as described above. U.S. patent application Ser. No. 14/853,478 by Huaiyu Liu, et al., entitled "Digital Representations of Analog Signals and Control Words Using Different Multi-Level Modulation Formats," ('478 Application), which is incorporated by reference, describes such a TDM-based channel aggregation and deaggregation system. In such embodiments, the application of FDW may also improve performance.

Figure 14:
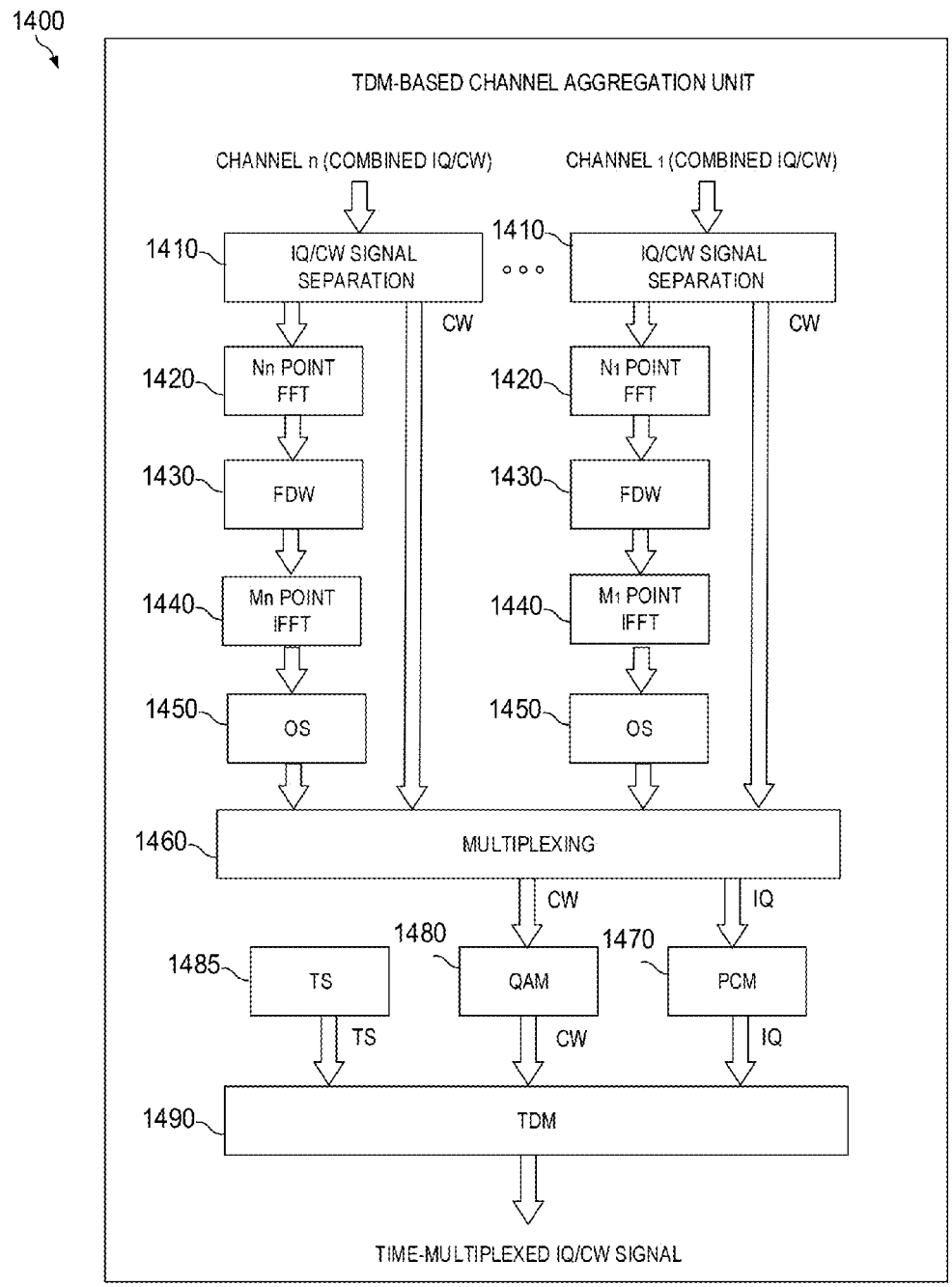
FIG. 14 is a schematic diagram of a TDM-based channel aggregation unit that performs FDW according to an embodiment of the disclosure.

FIG. 14 is a schematic diagram of a TDM-based channel aggregation unit 1400 that performs FDW according to an embodiment of the disclosure. The TDM-based channel aggregation unit 1400 is employed by the RRU 110 and BBUs 121 in place of the FDM-based channel aggregation units 200, 400, 600, 800, 1000, and 1200. The TDM-based channel aggregation unit 1400 may be implemented via software, hardware, or combinations thereof. The TDM-based channel aggregation unit 1400 comprises a plurality of IQ/control word (CW) signal separation units 1410, a plurality of FFT units 1420, a plurality of FDW units 1430, a plurality of IFFT units 1440, a plurality of OS units 1450, a multiplexing unit 1460, a pulse-code modulation (PCM) unit 1470, a quadrature-amplitude modulation (QAM) unit 1480, a training symbol (TS) insertion unit 1485, and a TDM unit 1490. The FFT units 1420 are similar to the FFT units 210, 310, 410, 510, 610, 710, 810, 910, 1010, 1110, 1210, and 1310. In some embodiments, the FFT units 1420 may be configured with larger FFT sizes than the FFT units 210, 310, 410, 510, 610, 710, 810, 910, 1010, 1110, 1210, and 1310. The FDW units 1430 are similar to the FDW units 450, 550, and 1050. The IFFT units 1440 are similar to the IFFT units 240, 340, 440, 540, 640, 740, 840, 940, 1040, 1140, 1240, and 1340. In some embodiments, the IFFT units 1440 may be configured with larger IFFT sizes than the IFFT units 240, 340, 440, 540, 640, 740, 840, 940, 1040, 1140, 1240, and 1340.

Each IQ/CW signal separation unit 1410 is configured to separate a combined IQ/CW signal into an IQ portion and a CW portion. For example, the combined IQ/CW signals are encoded according to a common public radio interface (CPRI) protocol as defined in CPRI specification V6.1, 2014. The IQ portion comprises digital IQ representations of the particular wireless RF channel, shown as channel 1 to channel n, and the CW portion comprises control information associated with the particular wireless RF channel, shown as channel 1 to channel n.

The FFT units 1420 are coupled to the IQ/CW signal separation units 1410. Each FFT unit 1420 is configured to perform $N_i$-point FFT on an IQ portion to produce a frequency signal. The FDW units 1430 are coupled to the FFT units 1420. Each FDW unit 1430 is configured to perform FDW on a frequency signal to produce a frequency-domain windowed signal. The IFFT units 1440 are coupled to the FDW units 1430. Each IFFT unit 1440 is configured to perform an $M_i$-point IFFT on a frequency-domain windowed signal to produce a time-domain signal. The IFFT size $M_i$ is typically less than the FFT size $N_i$. By using FDW, the channel data rate is reduced.

The OS units 1450 are coupled to the IFFT units 1440. Each OS unit 1450 is configured to combine successive time-domain signals generated by the IFFT unit 1440. The multiplexing unit 1460 is coupled to the IQ/CW signal separation unit 1410 and the OS units 1450. The multiplexing unit 1460 is configured to multiplex all time-domain signals output by the OS units 1450 to form an aggregated IQ signal and multiplex all CW signals output by the IQ/CW signal separation unit 1410 to form an aggregated CW signal. The aggregated IQ signal is an aggregation of IQ signals of the wireless RF channels. The aggregated CW signal is an aggregation of CW signals associated with the wireless RF channels.

The PCM unit 1470 is coupled to the multiplexing unit 1460 and configured to encode the aggregated IQ signal according to a PCM scheme to produce a PCM-coded IQ signal. The QAM unit 1480 is coupled to the multiplexing unit 1460 and configured to encode the aggregated CW signal according to a QAM scheme such as 4-quadrature-amplitude modulation (4-QAM) and 16-quadrature-amplitude modulation (16-QAM) to produce a QAM-coded CW signal. The TS insertion unit 1485 is configured to generate TS. For example, a TS may be a predetermined time sequence, which may be employed for frame detection and synchronization.

The TDM unit 1490 is coupled to the PCM unit 1470, the QAM unit 1480, and the TS insertion unit 1485. The TDM unit 1490 is configured to time-multiplex the PCM-coded IQ signal and the QAM-coded CW signal in a frame-by-frame basis. The TS insertion unit 1485 is configured to insert TS between the multiplexed IQ/CW frames. For example, a TS may be a predetermined time sequence, which may be employed for frame detection and synchronization. The TDM unit 1490 produces a time-multiplexed IQ/CW signal, which comprises successive multiplexed IQ/CW frames separated by TSs.

Figure 15:
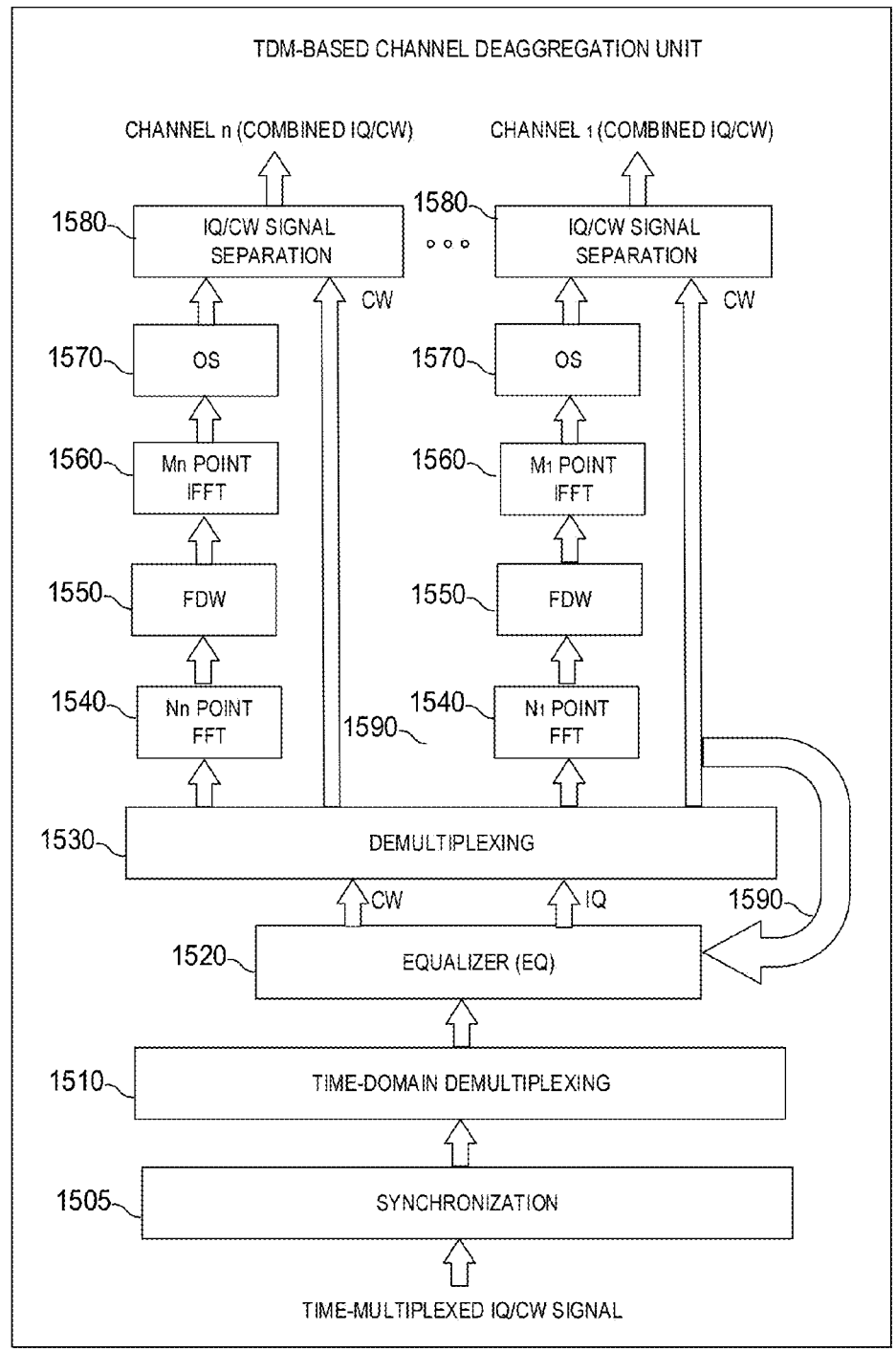
FIG. 15 is a schematic diagram of a TDM-based channel deaggregation unit that performs FDW according to an embodiment of the disclosure.

FIG. 15 is a schematic diagram of a TDM-based channel deaggregation unit 1500 that performs FDW according to an embodiment of the disclosure. The TDM-based channel deaggregation unit 1500 is employed by the RRU 110 and BBUs 121 in place of the FDM-based channel deaggregation units 300, 500, 700, 900, 1100, and 1300. The RRU 110 or the BBUs 121 may employ the TDM-based channel deaggregation unit 1500 in conjunction with the TDM-based channel aggregation unit 1400. The TDM-based channel deaggregation unit 1500 may be implemented via software, hardware, or combinations thereof. The TDM-based channel deaggregation unit 1500 comprises a synchronization unit 1505, a time-domain demultiplexing unit 1510, an equalizer (EQ) 1520, a demulitplexing unit 1530, a plurality of FFT units 1540, a plurality of FDW units 1550, a plurality of IFFT units 1560, a plurality of OS units 1570, and a plurality of IQ/CW signal separation units 1580. The FFT units 1540 are similar to the FFT units 210, 310, 410, 510, 610, 710, 810, 910, 1010, 1110, 1210, 1310, and 1420. In some embodiments, the FFT units 1540 may be configured with larger FFT sizes than the FFT units 210, 310, 410, 510, 610, 710, 810, 910, 1010, 1110, 1210, and 1310. The FDW units 1550 are similar to the FDW units 450, 550, 1050, 1150, 1250, 1350, and 1450. The IFFT units 1560 are similar to the IFFT units 240, 340, 440, 540, 640, 740, 840, 940, 1040, 1140, 1240, 1340, and 1440. In some embodiments, the IFFT units 1560 may be configured with larger IFFT sizes than the IFFT units 240, 340, 440, 540, 640, 740, 840, 940, 1040, 1140, 1240, and 1340. The OS units 1570 are similar to the OS units 1450.

The synchronization unit 1505 is configured to receive a time-multiplexed IQ/CW signal, detect the beginning of a frame, and synchronize to the transmitter of the received signal. The time-domain demultiplexing unit 1510 is coupled to the synchronization unit 1505 and configured to perform time-domain demultiplexing to obtain an IQ data signal and a CW signal. The EQ 1520 is coupled to the time-domain demultiplexing unit 1510 and configured to perform channel equalization on the IQ signal and the CW signal and to demodulate the CW signal according to a predetermined modulation scheme that is employed by a transmitter of the received time-multiplexed IQ/CW signal. Channel equalization removes or suppresses inter-symbol interference (ISI) or inter-sample interference. The EQ 1520 is trained and updated by feeding the demodulated CW signal back to the EQ 1520 as shown by the arrow 1590.

The demultiplexing unit 1530 is coupled to the equalizer 1520 and configured to separate the demodulated IQ data signal into multiple IQ signals and to separate the demodulated CW signal into multiple CW signals according to a predetermined time slot schedule. For example, the aggregated IQ signal and the aggregated CW signal are generated by the TDM-based channel aggregation unit 1400 and the predetermined time slot schedule corresponds to a time slot schedule employed by the TDM-based channel aggregation unit 1400. Each separated IQ signal and each CW signal correspond to a particular wireless RF channel.

The FFT units 1540 are coupled to the demultiplexing unit 1530. Each FFT unit 1540 is configured to perform $M_I$-point FFT on a separate IQ signal to produce a frequency IQ signal. The FDW units 1550 are coupled to the FFT units 1540. Each FDW unit 1550 is configured to perform FDW on a frequency IQ signal to produce a frequency-domain windowed IQ signal. The IFFT units 1560 are coupled to the FDW units 1550. Each IFFT unit 1560 is configured to perform an $N_I$-point IFFT on a frequency-domain windowed IQ signal to produce a time-domain IQ signal. The OS units 1570 are coupled to the IFFT units 1560 and configured to combine successive time-domain signals output by the IFFT units 1560. The application of the FDW provides similar benefits as in the FDM-based channel deaggregation described above.

The IQ/CW signal combination units 1580 are coupled to the OS units 1570 and the demultiplexing unit 1530 and configured to combine an IQ time-domain signal and a CW signal for an associated wireless RF channel, shown as channel 1 to channel n.

Figure 16:
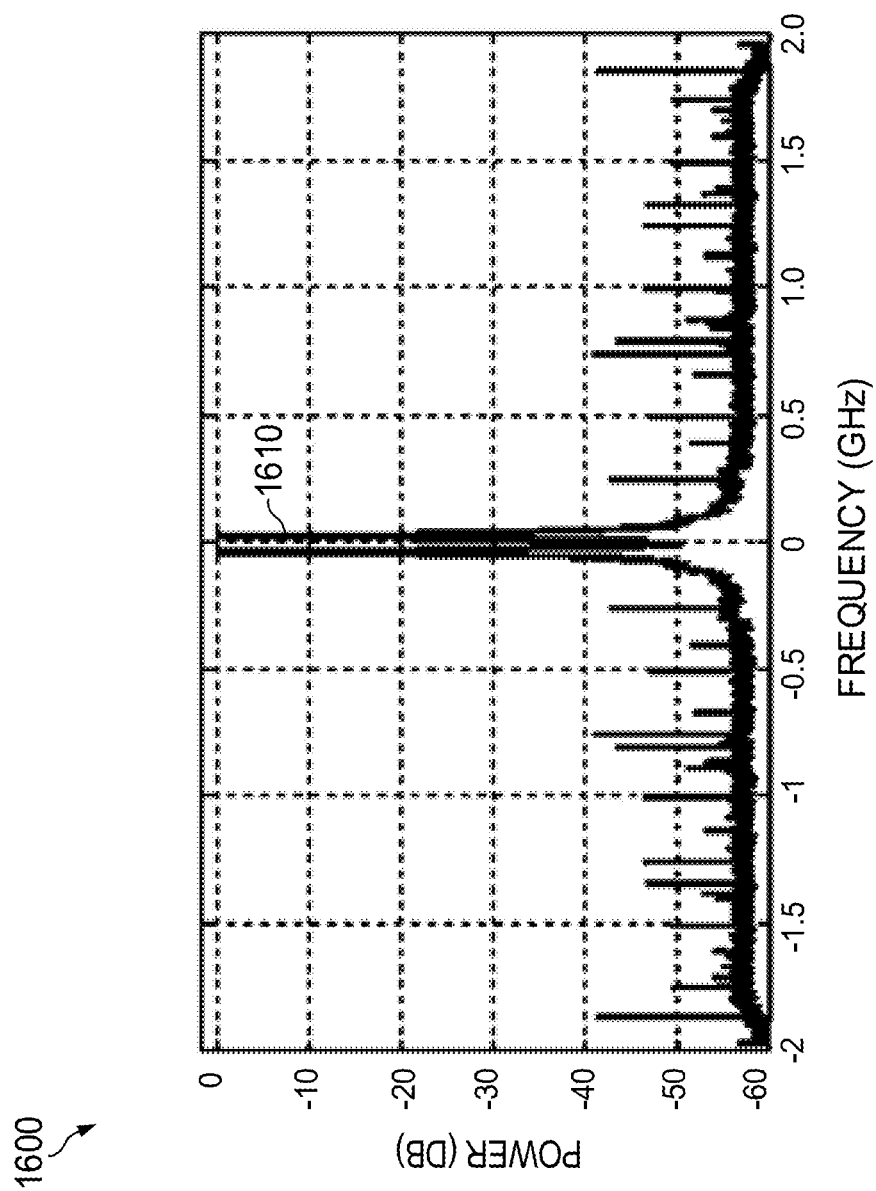
FIG. 16 is a graph illustrating a measured frequency spectrum of a single carrier signal according to an embodiment of the disclosure.
Figure 18:
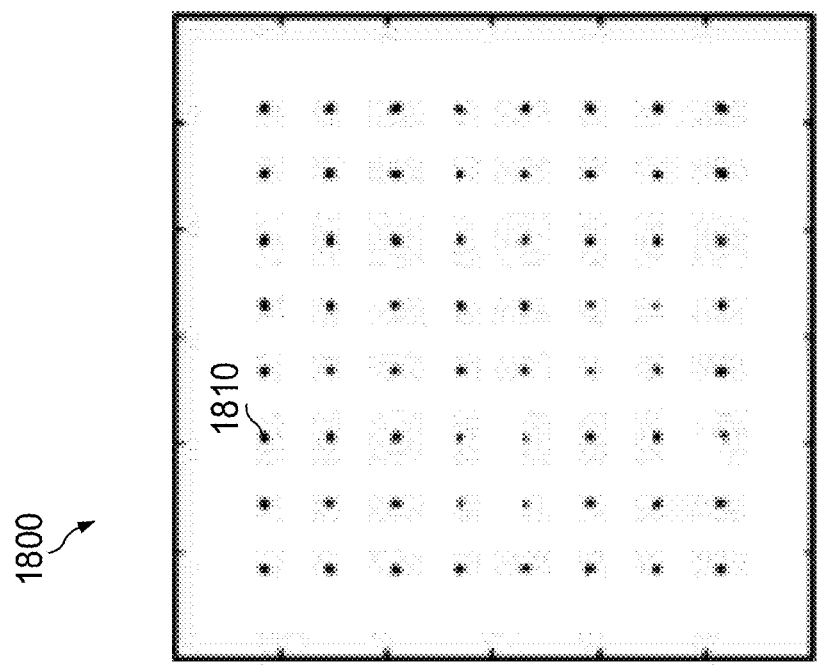
FIG. 18 is a graph illustrating a constellation plot of a single carrier signal deaggregated with FDW according to an embodiment of the disclosure.
Figure 17:
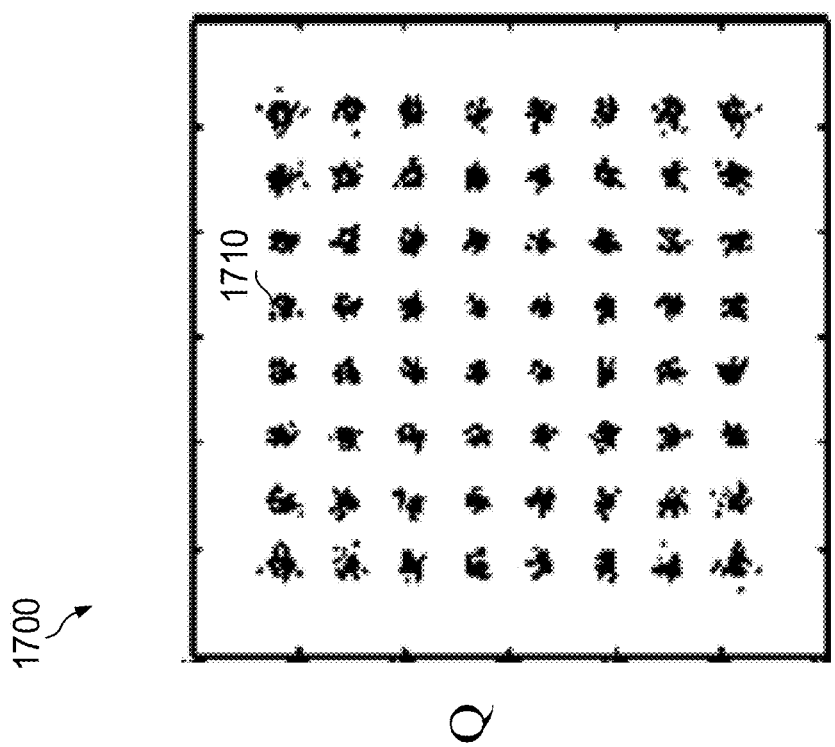
FIG. 17 is a graph illustrating a constellation plot of a single carrier signal deaggregated without FDW according to an embodiment of the disclosure.

FIGS. 16-18 illustrate the improvement in performance for a single channel signal provided by FDW. FIG. 16 is a graph 1600 illustrating a measured frequency spectrum 1610 of a single channel signal according to an embodiment of the disclosure. The y-axis represents power in units of decibel (dB). The x-axis represents frequency in units of gigahertz (GHz). The single channel signal is generated by the FDM-based channel aggregation unit 400 when a single 20 MHz signal is input at the FDM-based channel aggregation unit 400 and an FFT size of 16.

FIG. 17 is a graph 1700 illustrating a constellation plot of a single channel signal deaggregated without FDW according to an embodiment of the disclosure. The single channel signal is generated by the FDM-based channel aggregation unit 200 when a single 20 MHz signal is input at the FDM-based channel aggregation unit 200 and an FFT size of 16. The x-axis represents I components in some constant units. The y-axis represents Q components in some constant units. The constellation points 1710 are captured when the FDM-based channel deaggregation unit 500 performs deaggregation on the single channel signal of FIG. 16 with an IFFT size of 16 and bypassing FDW. As shown, the constellation points 1710 are gathered in 64 clusters corresponding to a 64-quadrature amplitude modulation (64-QAM) constellation. The measured error vector magnitude (EVM) for the constellation points 1710 is about 1.68 percent (%).

FIG. 18 is a graph 1800 illustrating a constellation plot of a single channel signal deaggregated with FDW according to an embodiment of the disclosure. The single channel signal is generated by the FDM-based channel aggregation unit 400 when a single 20 MHz signal is input at the FDM-based channel aggregation unit 400 and an FFT size of 16. The x-axis represents I components in some constant units. The y-axis represents Q components in some constant units. The constellation points 1810 are captured when the FDM-based channel deaggregation unit 500 performs deaggregation on the single channel signal of FIG. 16 with an IFFT size of 16 and applying FDW. Comparing the graphs 1700 and 1800, the constellation points 1810 are gathered in tighter or less scattered clusters than the constellation points 1710. The measured EVM of the constellation points 1810 is about 0.37%. Thus, the application of the FDW provides about 13 dB gain for a single channel signal.

Figure 19:
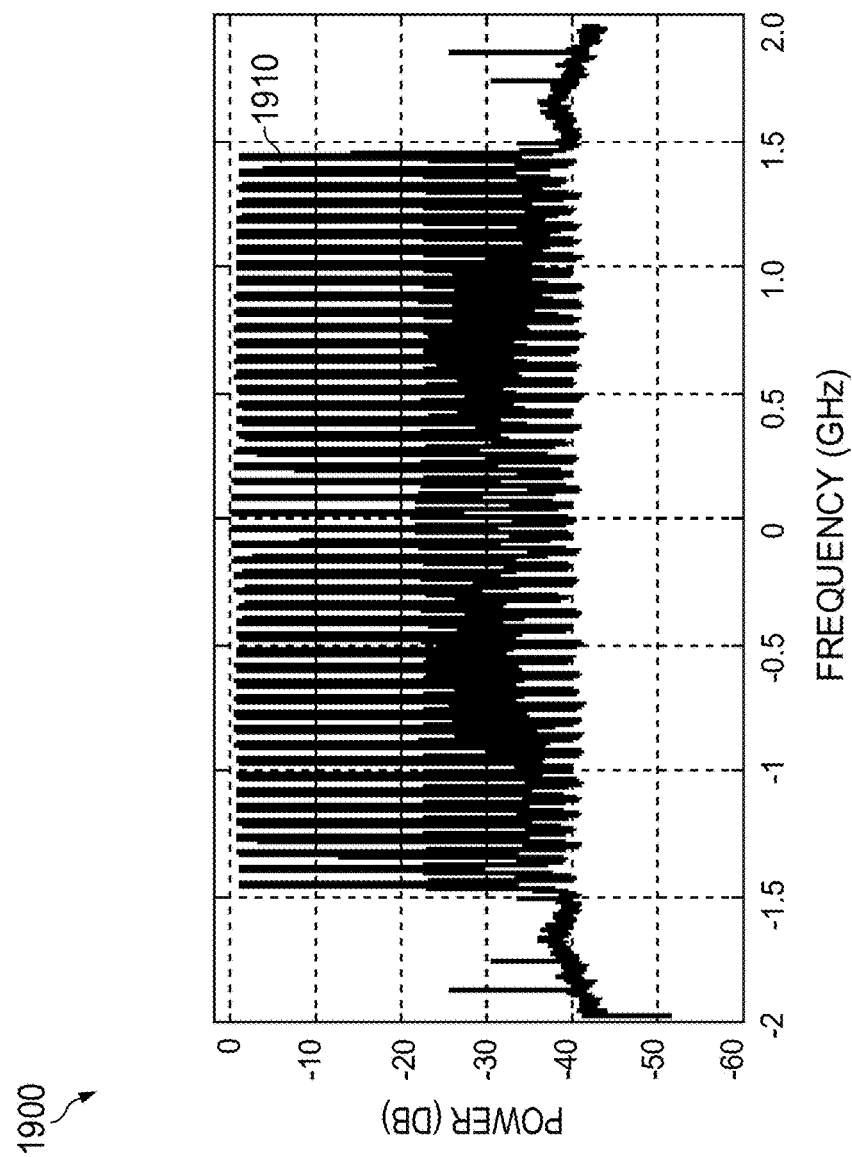
FIG. 19 is a graph illustrating a measured frequency spectrum of an aggregated signal according to an embodiment of the disclosure.
Figure 21:
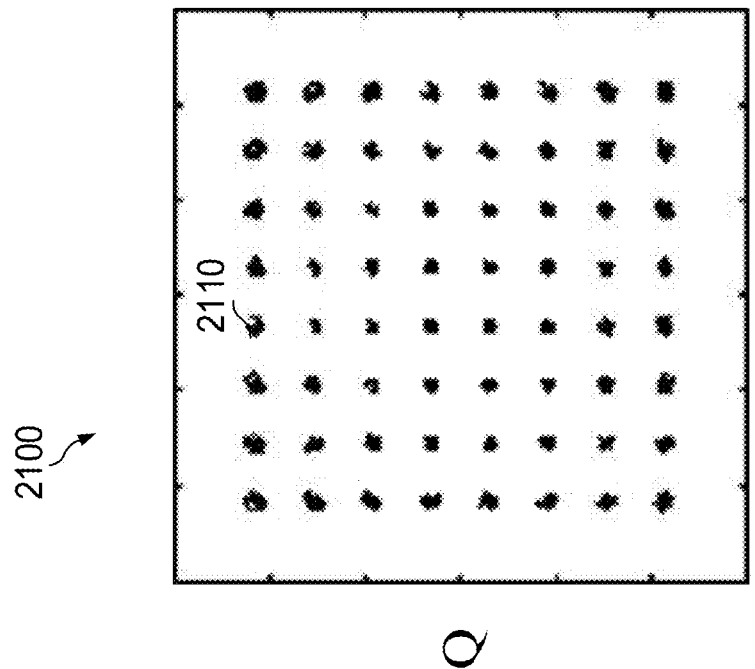
FIG. 21 is a graph illustrating a constellation plot of an aggregated signal deaggregated with FDW according to an embodiment of the disclosure.
Figure 20:
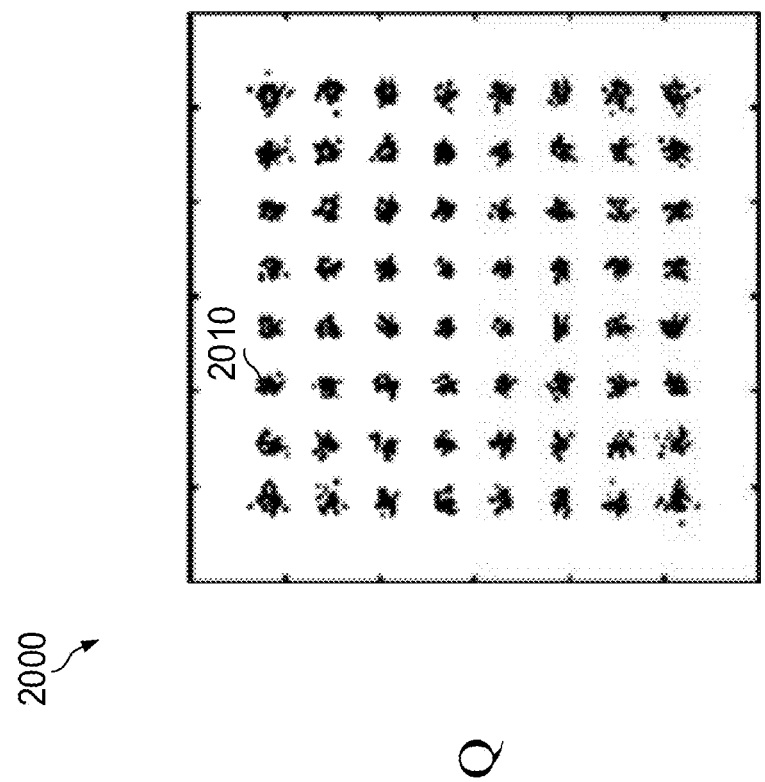
FIG. 20 is a graph illustrating a constellation plot of an aggregated signal deaggregated without FDW according to an embodiment of the disclosure.

FIGS. 19-21 illustrate the improvement in performance for an aggregated signal provided by FDW. FIG. 19 is a graph 1900 illustrating a measured frequency spectrum 1910 of an aggregated signal according to an embodiment of the disclosure. The y-axis represents power in units of dB. The x-axis represents frequency in units of GHz. The aggregated signal is an aggregation of twenty-four 20 MHz signals. The aggregated signal is generated by the FDM-based channel aggregation unit 400 with an FFT size of 16.

FIG. 20 is a graph 2000 illustrating a constellation plot of an aggregated signal that is deaggregated without FDW according to an embodiment of the disclosure. The aggregated signal is generated by the FDM-based channel aggregation unit 200 with an FFT size of 16. The x-axis represents I components in some constant units. The y-axis represents Q components in some constant units. The constellation points 2010 are captured when the FDM-based channel deaggregation unit 500 deaggregates the aggregated signal of FIG. 19 with an IFFT size of 16 and bypassing FDW. The constellation points 2010 comprise constellation points of the twenty-four 20 MHz signals. As shown, the constellation points 2010 are gathered in 64 clusters corresponding to a 64-QAM constellation. The EVM for the constellation points 2010 is about 2.3%.

FIG. 21 is a graph 2100 illustrating a constellation plot of an aggregated signal deaggregated with FDW according to an embodiment of the disclosure. The aggregated signal is generated by the FDM-based channel aggregation unit 400 with an FFT size of 16. The x-axis represents I components in some constant units. The y-axis represents Q components in some constant units. The constellation points 2110 are captured when the FDM-based channel deaggregation unit 500 deaggregates the aggregated signal of FIG. 19 with an IFFT size of 16 and applying FDW. The constellation points 2110 comprise constellation points of the twenty-four 20 MHz signals. Comparing the graphs 2000 and 2100, the constellation points 2110 are gathered in tighter or less scattered clusters than the constellation points 2010. The measured EVM for the constellation points 2010 is about 1.66%. Thus, the application of the FDW provides about 3 dB gain for an aggregated signal with an aggregation of twenty-four 20 MHz signals.

Figure 22:
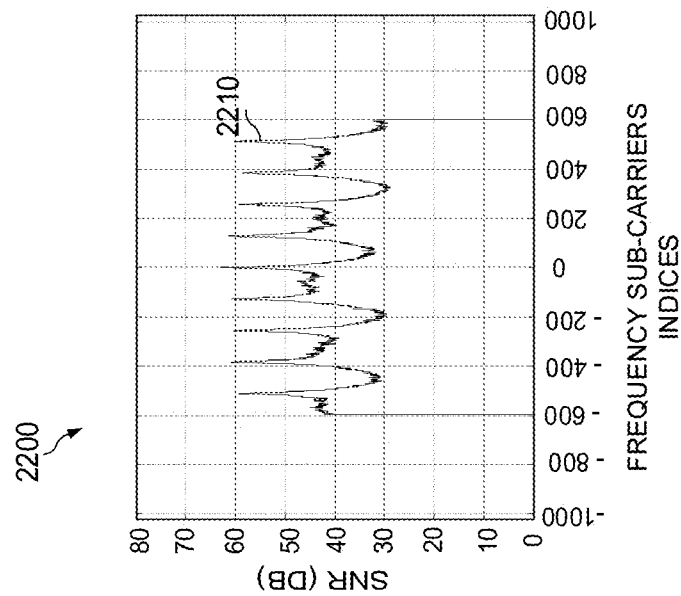
FIG. 22 is a graph illustrating a simulated signal-to-noise ratio (SNR) plot of an aggregated long-term evolution (LTE) signal generated without FDW according to an embodiment of the disclosure.

FIGS. 22-25 illustrate the improvement in SNR provided by FDW, FS, and TDW. The x-axis represents frequency sub-carrier indices. The y-axis represents SNR in units of dB. FIG. 22 is a graph 2200 illustrating a simulated SNR plot 2210 of an aggregated LTE signal generated without FDW according to an embodiment of the disclosure. The aggregated LTE signal is generated by employing the FDM-based channel aggregation unit 200 with an FFT size of 16. The SNR plot 2210 shows the SNRs of the aggregated LTE signal as a function of frequency sub-carrier indices. In the SNR plot 2210, the average SNR is about 41.42 dB and the minimum SNR is about 28.78 dB. The variations are caused by spectral leakage when using a smaller FFT size without windowing.

Figure 23:
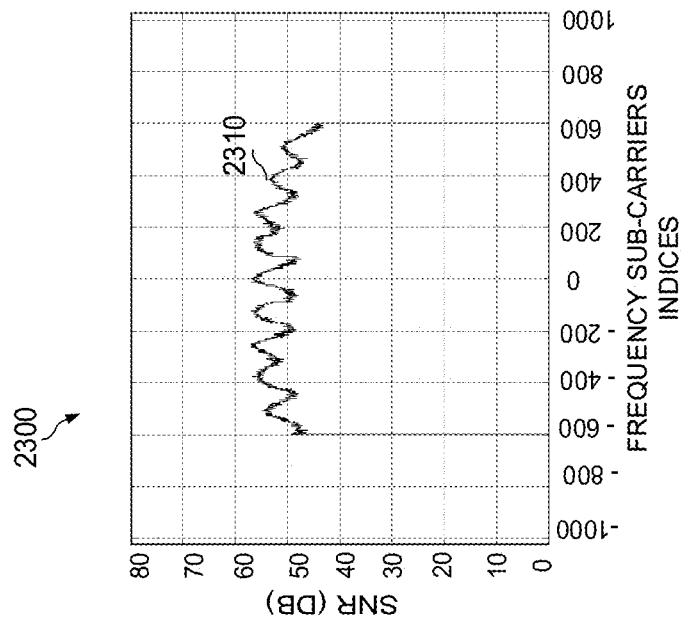
FIG. 23 is a graph illustrating a simulated SNR plot of an aggregated LTE signal generated with FDW according to an embodiment of the disclosure.

FIG. 23 is a graph 2300 illustrating a simulated SNR plot 2310 of an aggregated LTE signal generated with FDW according to an embodiment of the disclosure. The aggregated LTE signal is generated by employing the FDM-based channel aggregation unit 400 with an FFT size of 16. The SNR plot 2310 shows the SNRs of the aggregated LTE signal as a function of frequency sub-carrier indices. In the SNR plot 2310, the average SNR is about 51.85 dB and the minimum SNR is about 43.1 dB. Comparing the SNR plots 2210 and 2310, the application of the FDW improves the average SNR by about 10 dB and the minimum SNR by about 15 dB. Although the average and minimum SNRs are improved, the performance is not symmetrical about the frequency sub-carrier index 0. As shown, there is a drop in SNRs at frequency sub-carriers 400 to 600.

FIG. 24 is a graph 2400 illustrating a simulated SNR plot 2410 of an aggregated LTE signal generated with FDW and FS according to an embodiment of the disclosure. The aggregated LTE signal is generated by employing the FDM-based channel aggregation unit 1000 with an FFT size of 16. The SNR plot 2410 shows the SNRs of the aggregated LTE signal as a function of frequency sub-carrier indices. In the SNR plot 2410, the average SNR is about 52.5 dB and the minimum SNR is about 46.56 dB. The SNRs are symmetrical about the frequency sub-carrier index 0. Thus, the application of FS improves the overall performance across all frequency sub-carriers.

FIG. 25 is a graph 2500 illustrating a simulated SNR plot 2510 of an aggregated LTE signal with FDW, FS, and TDW according to an embodiment of the disclosure. The aggregated LTE signal is generated by employing the FDM-based channel aggregation unit 1200 with an FFT size of 16. The SNR plot 2510 shows the SNRs of the aggregated LTE signal as a function of frequency sub-carrier indices. In the SNR plot 2510, the average SNR is about 54.76 dB and the minimum SNR is about 46.58 dB. Comparing the SNR plots 2410 and 2510, the application of the TDW significantly reduces SNR fluctuations or ripples, providing a flat SNR response. Thus, the application of FDW, FS, and TDW improves the SNR across all frequency sub-carriers.

Figure 26:
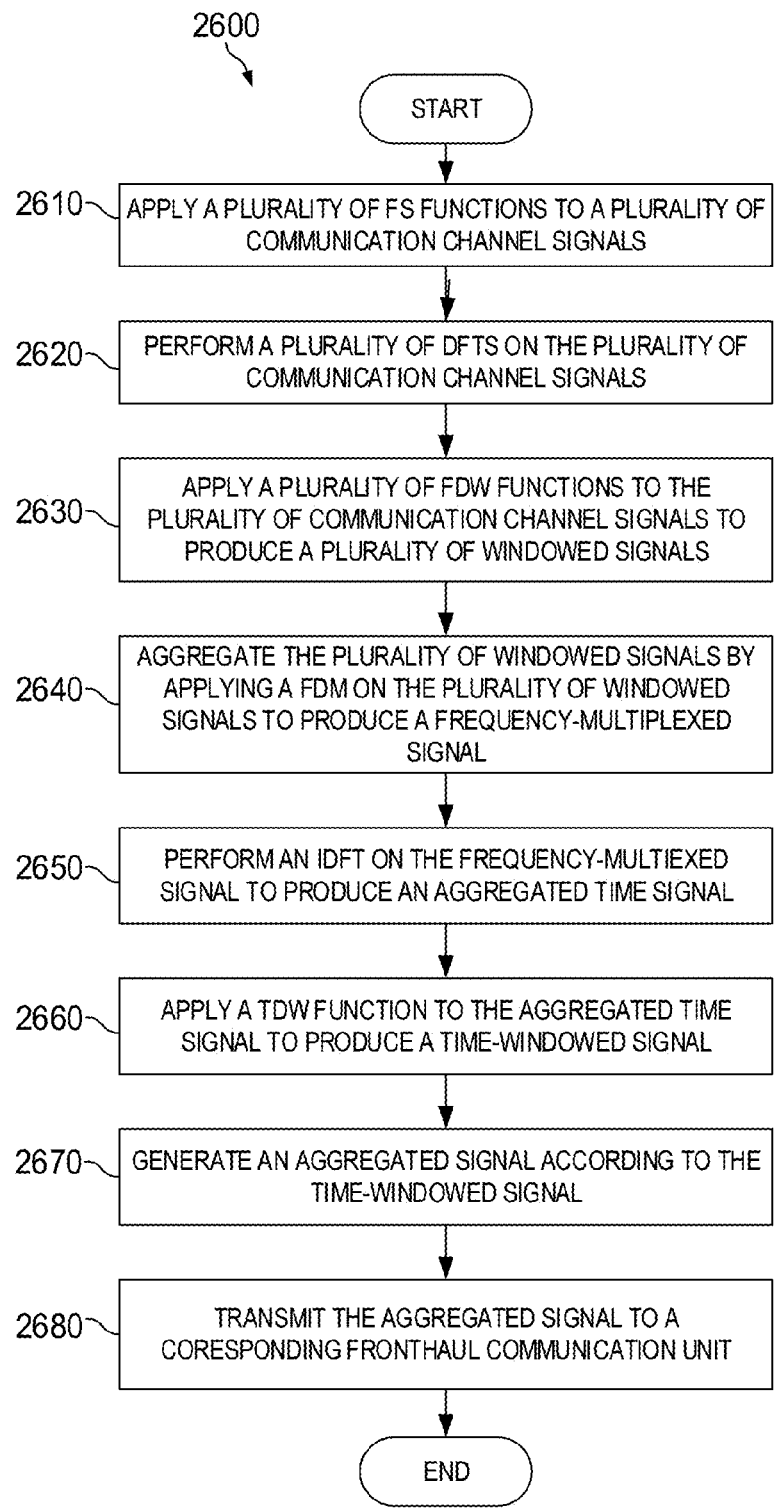
FIG. 26 is a flowchart of a method for performing FDM-based channel aggregation according to an embodiment of the disclosure.

FIG. 26 is a flowchart of a method 2600 for performing FDM-based channel aggregation according to an embodiment of the disclosure. The method 2600 is implemented by the RRU 110 and the BBUs 121. The method 2600 employs similar mechanisms as the FDM-based channel aggregation units 400, 600, 800, 1000, and 1200. The method 2600 is implemented when receiving a plurality of communication channel signals. The plurality of communication channel signals correspond to UL wireless channel signals when implemented at the RRU 110. The plurality of communication channel signals correspond to DL wireless channel signals when implemented at the BBUs 121. At step 2610, a plurality of FS functions, such as the FS function shown in equation (2), are applied to the plurality of communication channel signals. At step 2620, after applying the FS functions, a plurality of DFTs is performed on the plurality of communication channel signals. At step 2630, after performing the DFTs, a plurality of FDW functions are applied to the plurality of communication channel signals to produce a plurality of windowed signals. At step 2640, the plurality of windowed signals is aggregated by applying an FDM on the plurality of windowed signals to produce a frequency-multiplexed signal. At step 2650, an IDFT is performed on the frequency-multiplexed signal to produce an aggregated time signal. At step 2660, a TDW function is applied to the aggregated time signal to produce a time-windowed signal. At step 2670, an aggregated signal is generated according to the time-windowed signal. For example, an OS approach is used to generate the aggregated signal from the time-windowed signal. At step 2680, the aggregated signal is transmitted to a corresponding fronthaul communication unit such as the RRU 110 or the BBUs 121 over a fronthaul communication link such as the link 130 to facilitate fronthaul communication. It should be noted that the steps of 2610 and 2660 may be optional.

Figure 27:
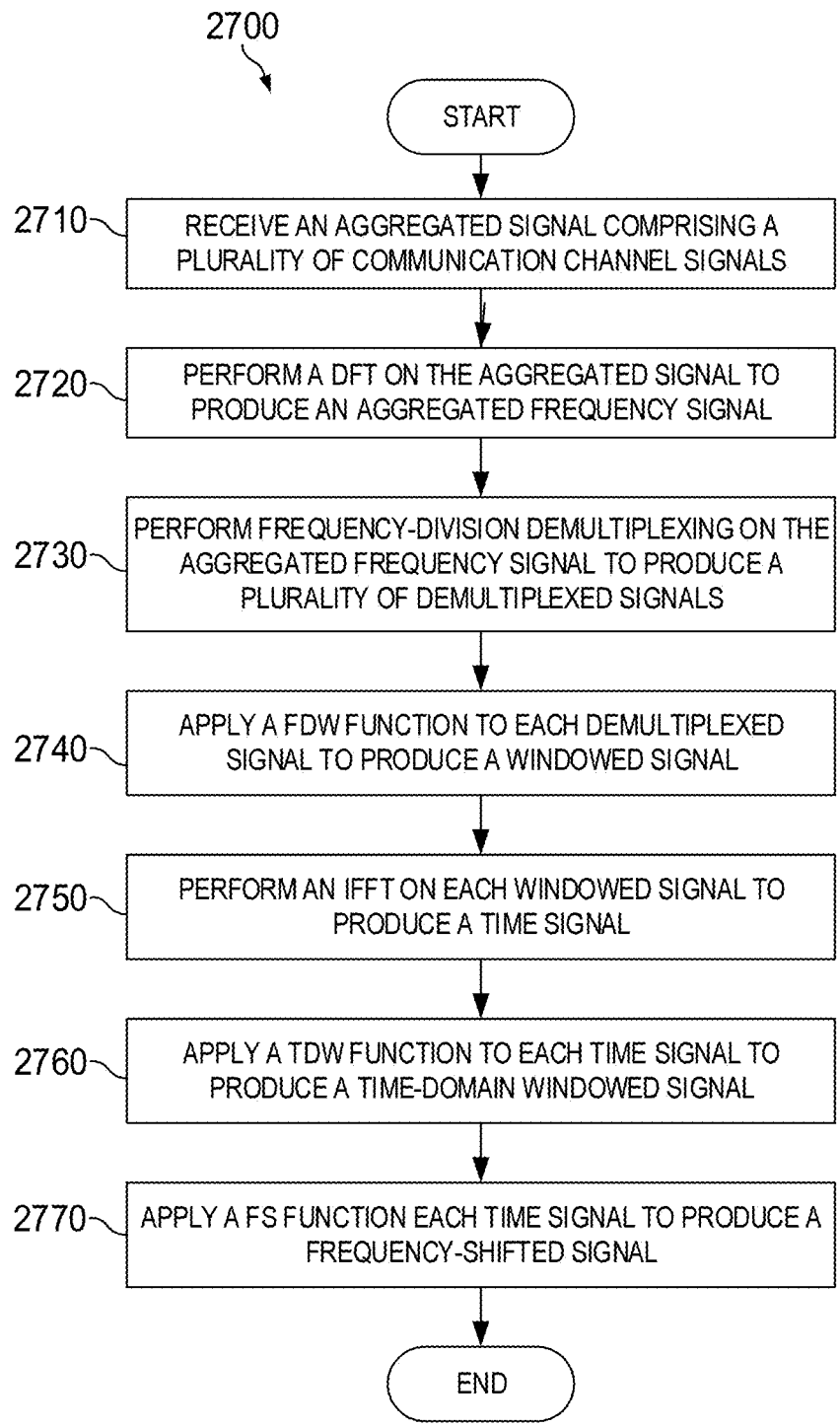
FIG. 27 is a flowchart of a method for performing FDM-based channel deaggregation according to an embodiment of the disclosure.

FIG. 27 is a flowchart of a method 2700 for performing FDM-based channel deaggregation according to an embodiment of the disclosure. The method 2700 is implemented by the RRU 110 and the BBUs 121. The method 2700 employs similar mechanisms as the FDM-based channel deaggregation units 500, 700, 900, 1100, and 1300. The method 2700 is implemented when performing channel deaggregation. At step 2710, an aggregated signal is received from a fronthaul communication link such as the link 130. The aggregated signal comprises a plurality of communication channel signals. The plurality of communication channel signals correspond to DL wireless channel signals when implemented at the RRU 110. The plurality of communication channel signals correspond to UL wireless channel signals when implemented at the BBUs 121. At step 2720, a DFT is performed on the aggregated signal to produce an aggregated frequency signal. At step 2730, frequency-division demultiplexing is performed on the aggregated frequency signal to produce a plurality of demultiplexed signals. At step 2740, an FDW function, such as the FDW function shown in equation (1), is applied to each demultiplexed signal to produce a windowed signal. At step 2750, an IFFT is performed on each windowed signal to produce a time signal. At step 2760, a TDW function is applied to each time signal to produce a time-domain windowed signal. At step 2770, an FS function, such as the FS function shown in equation (3), is applied to each time-domain windowed signal to produce a frequency-shifted signal. It should be noted that the steps of 2760 and 2770 may be optional.

Figure 28:
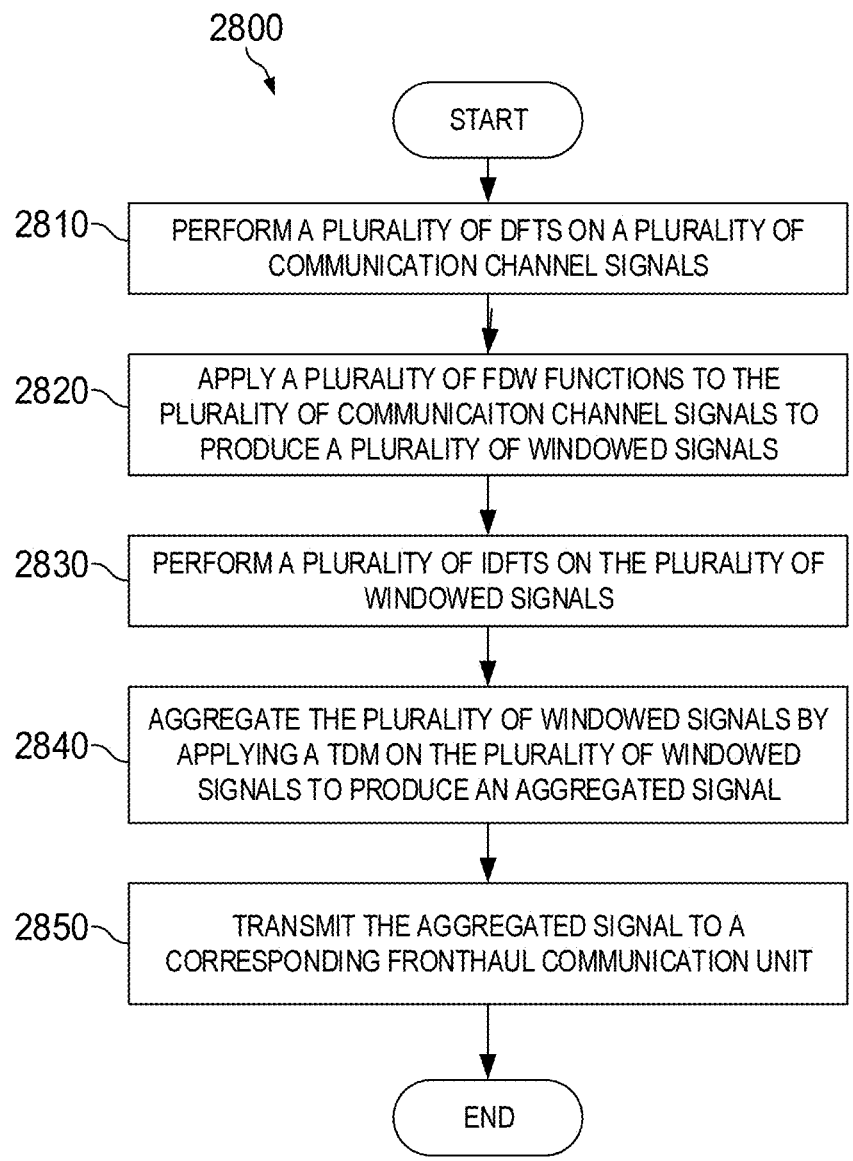
FIG. 28 is a flowchart of a method for performing TDM-based channel aggregation according to an embodiment of the disclosure.

FIG. 28 is a flowchart of a method 2800 for performing TDM-based channel aggregation according to an embodiment of the disclosure. The method 2800 is implemented by the RRU 110 and the BBUs 121. The method 2800 employs similar mechanisms as the TDM-based channel aggregation unit 1400. The method 2800 is implemented when receiving a plurality of communication channel signals. The plurality of communication channel signals correspond to UL wireless channel signals when implemented at the RRU 110. The plurality of communication channel signals correspond to DL wireless channel signals when implemented at the BBUs 121. In an embodiment, an RRU or a BBU may employ a radio interface encoding scheme such as the CPRI to encode IQ signals and CW signals of wireless RF channels. In such an embodiment, the method 2800 is implemented after separating combined IQ/CW signals into IQ signals and CW signals by employing the IQ/CW signal separation units 1410, where plurality of communication channel signals correspond to the IQ signals of the wireless RF channels. At step 2810, a plurality of DFTs is performed on the plurality of communication channel signals. At step 2820, after performing the DFTs, a plurality of FDW functions are applied to the plurality of communication channel signals to produce a plurality of windowed signals. At step 2830, a plurality of IDFTs is performed on the plurality of windowed signals. At step 2840, after performing the IDFTs, the plurality of windowed signals is aggregated by applying a TDM on the plurality of windowed signals to produce an aggregated signal. At step 2850, the aggregated signal is transmitted to a corresponding fronthaul communication unit such as the RRU 110 or the BBUs 121 over a fronthaul communication link such as the link 130.

Figure 29:
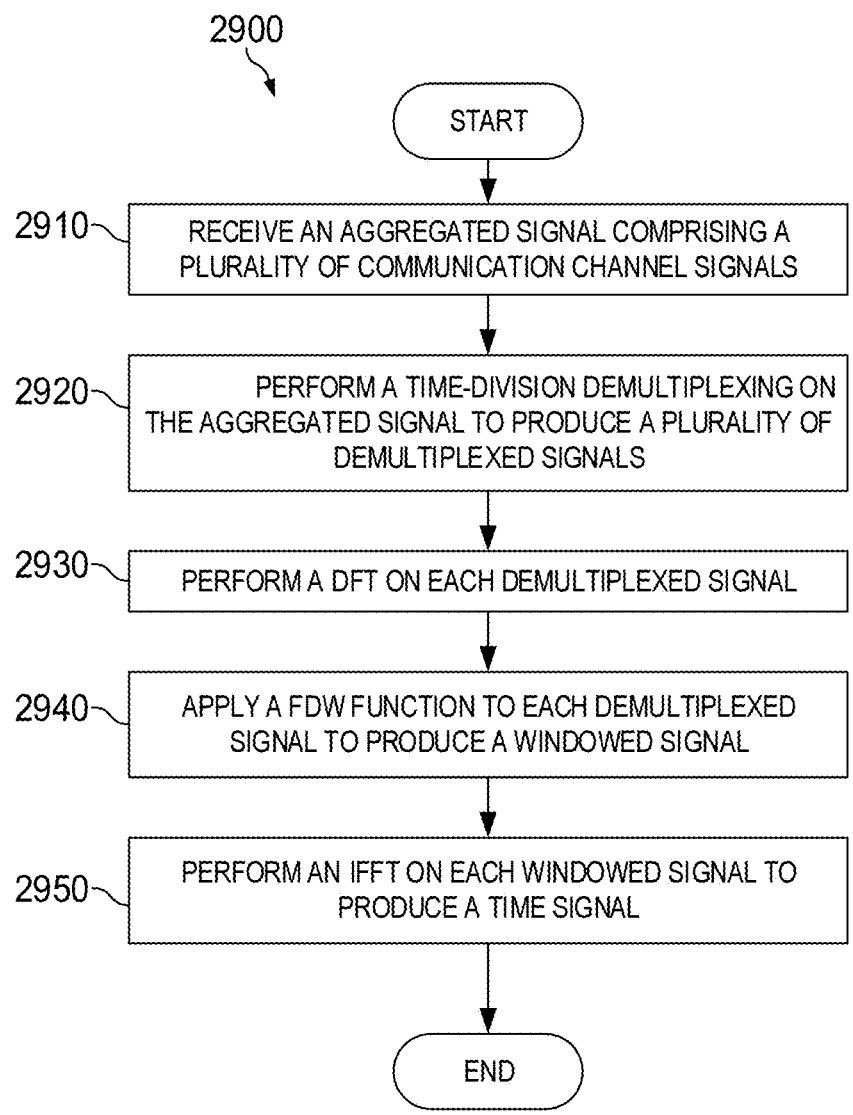
FIG. 29 is a flowchart of a method for performing TDM-based channel deaggregation according to an embodiment of the disclosure.

FIG. 29 is a flowchart of a method 2900 for performing TDM-based channel deaggregation according to an embodiment of the disclosure. The method 2900 is implemented by the RRU 110 and the BBUs 121. The method 2900 employs similar mechanism as the FDM-based channel deaggregation unit 1500. The method 2900 is implemented when performing channel deaggregation. At step 2910, an aggregated signal is received from a fronthaul communication link such as the link 130. The aggregated signal comprises a plurality of communication channel signals. The plurality of communication channel signals correspond to DL wireless channel signals when implemented at the RRU 110. The plurality of communication channel signals correspond to UL wireless channel signals when implemented at the BBUs 121. At step 2920, a time-division demultiplexing is performed on the aggregated signal to produce a plurality of demultiplexed signals corresponding to the plurality of communication channel signals. In an embodiment, an RRU or a BBU may employ a radio interface encoding scheme such as the CPRI to encode IQ signals and CW signals of wireless RF channels. In such embodiments, the aggregated signal carries an aggregated IQ signal and an aggregated CW signal multiplexed in time. The aggregated IQ signal comprises an aggregation of IQ signals of all wireless RF channels, and the aggregated CW signal comprises an aggregation of CW signals of all wireless RF channels, where the IQ signals correspond to the plurality of communication channel signals. Thus, the time-domain demultiplexing unit 1510 separates the aggregated IQ signal and the aggregated CW signals from the aggregated signal before demultiplexing the aggregated IQ signal into the plurality of demultiplexed signals.

At step 2930, a DFT is performed on each demultiplexed signal. At step 2940, after performing the DFTs, an FDW function is applied to each demultiplexed signal to produce a windowed signal. At step 2950, an IFFT is performed on each windowed signal to produce a time signal corresponding to a communication channel.

Figure 30:
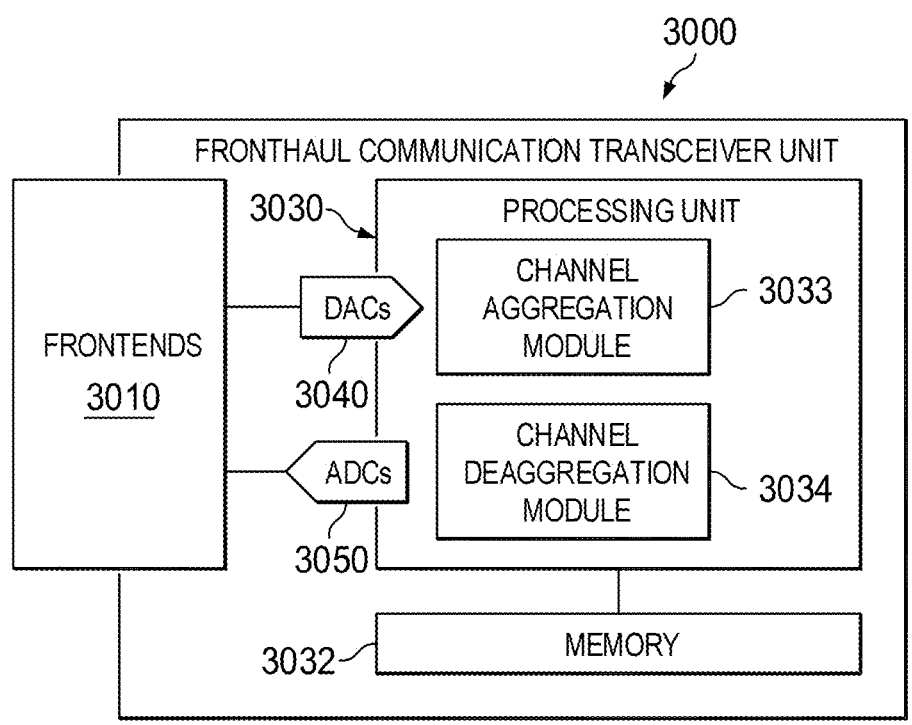
FIG. 30 is a schematic diagram of an embodiment of a fronthaul communication transceiver unit.

FIG. 30 is a schematic diagram of an embodiment of a fronthaul communication transceiver unit 3000, which may be any device that transmits or receives optical signals or RF signals. For example, the transceiver unit 3000 may be located in an optical communication device such as the RRU 110 and the BBUs 121 in a wireless fronthaul communication system such as the system 100. The transceiver unit 3000 is suitable for implementing the disclosed embodiments. One skilled in the art will recognize that the term "transceiver unit" encompasses a broad range of devices of which transceiver unit 3000 is merely an example. The transceiver unit 3000 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 3000. For instance, the features and methods in the disclosure may be implemented using hardware, firmware, and/or software installed to run on hardware. As shown in FIG. 30, the transceiver unit 3000 comprises a plurality of frontends 3010. The frontends 3010 may comprise an optical frontend and/or a RF frontend. For example, the optical frontend may comprise electrical-to-optical (E/O) components and/or optical-to-electrical (O/E) components that convert an electrical signal to an optical signal for transmission in a wireless fronthaul optical network and/or receive an optical signal from the wireless fronthaul network and convert the optical signal to an electrical signal, respectively. The RF frontend may comprise RF components, RF devices that receive and transmit wireless RF signals.

A processing unit 3030 is coupled to the frontends 3010 via a plurality of digital-to-analog converters (DACs) 3040 and analog-to-digital converters (ADCs) 3050. The DACs 3040 convert digital electrical signals generated by the processing unit 3030 into analog electrical signals that are fed into the frontend 3010. The ADCs 3050 convert analog electrical signals received from the frontends 3010 into digital electrical signals that are processed by the processing unit 3030. In some embodiments, the ADCs 3050 and the DACs 3040 may be integrated with the processing unit 3030. The processing unit 3030 may be implemented as one or more central processing unit (CPU) chips, cores (e.g., as a multi-core processor), field-programmable gate arrays (FPGAs), application specific integrated circuits (ASICs), and DSPs. The processing unit 3030 comprises a channel aggregation module 3033 and a channel deaggregation module 3034.

The channel aggregation module 3033 implements digital channel aggregation as described in FDM-based channel aggregation units 400, 600, 800, 1000, and 1200 and the TDM-based channel aggregation unit 1400, the methods 2600 and 2800, and/or other flowcharts, schemes, and methods described herein. The channel deaggregation module 3034 implements digital channel deaggregation as described in the FDM-based channel deaggregation units 500, 700, 900, 1100, and 1300 and the TDM-based channel deaggregation unit 1500, the methods 2700 and 2900, and/or other flowcharts, schemes, and methods described herein. The inclusion of the channel aggregation module 3033 and the channel deaggregation module 3034 therefore provides a substantial improvement to the functionality of the transceiver unit 3000 and effects a transformation of the transceiver unit 3000 to a different state. In an alternative embodiment, the channel aggregation module 3033 and the channel deaggregation module 3034 may be implemented as instructions stored in the memory 3032, which may be executed by the processing unit 3030.

The memory 3032 comprises one or more disks, tape drives, and solid-state drives and may be used as an overflow data storage device, to store programs when such programs are selected for execution, and to store instructions and data that are read during program execution. The memory 3032 may be volatile and non-volatile and may be read-only memory (ROM), random-access memory (RAM), ternary content-addressable memory (TCAM), and static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented in a fronthaul communication unit, comprising:
    applying, via a processor, a frequency-shifting (FS) function to one of a plurality of first communication channel signals in a time domain, wherein the FS function comprises $$FS1(k) = \exp^{\frac{-j \times 2 \times \pi \times k}{2K}},$$

where FS1(k) represents the FS function, exp represents an exponential function, j represents a square root of minus one, π represents the value 3.14159, k represents a time sample index of the one of the plurality of first communication channel signals in a time frame of K samples, and K corresponds to a size of a first discrete Fourier transform (DFT);
    performing, via a processor, a plurality of DFTs on the plurality of first communication channel signals;
    applying, via a processor of the fronthaul communication unit, a plurality of first frequency-domain windowing (FDW) functions on the plurality of first communication channel signals to produce a plurality of first windowed signals, with the FDW functions comprising a sequence of FDW coefficients, and with a first half of the FDW coefficients being symmetrical to a second half of the FDW coefficients;
    aggregating, via the processor, the plurality of first windowed signals to produce a first aggregated signal, wherein aggregating the plurality of first windowed signals comprises performing a frequency-division multiplexing (FDM) on the plurality of first windowed signals; and
    transmitting, via a frontend of the fronthaul communication unit, the first aggregated signal to a corresponding fronthaul communication unit over a fronthaul communication link to facilitate fronthaul communication.

2. The method of claim 1, further comprising selecting, via the processor, the plurality of first FDW functions according to spectral properties of the plurality of first communication channel signals.

3. The method of claim 1, wherein aggregating the plurality of first windowed signals further comprises:
    performing an inverse DFT (IDFT) after applying the plurality of first FDW functions to produce an aggregated time signal;
    applying a time-domain windowing (TDW) function to the aggregated time signal to produce a time-domain windowed signal; and
    generating the first aggregated signal according to the time-domain windowed signal.

4. The method of claim 1, further comprising:
    performing, via the processor, a plurality of discrete Fourier transforms (DFTs) on the plurality of first communication channel signals before applying the plurality of first FDW functions; and
    performing, via the processor, a plurality of inverse DFTs (IDFTs) on the plurality of first windowed signals;
    wherein aggregating the first plurality of windowed signals comprises performing a time-division multiplexing (TDM) on the plurality of first windowed signals after performing the plurality of IDFTs.

5. The method of claim 1, further comprising:
receiving, via the frontend, a second aggregated signal from the fronthaul communication link, wherein the second aggregated signal comprises a plurality of second communication channel signals;
demultiplexing, via the processor, the second aggregated signal to produce a plurality of demultiplexed signals corresponding to the plurality of second communication channel signals; and
applying, via the processor, a second FDW function to a first of the plurality of demultiplexed signals to produce a second windowed signal.

6. The method of claim 5, wherein demultiplexing the second aggregated signal comprises:
performing, via the processor, a discrete Fourier transform (DFT) on the second aggregated signal to produce an aggregated frequency signal; and
performing, via the processor, a frequency-division demultiplexing on the aggregated frequency signal to produce the plurality of demultiplexed signals.

7. The method of claim 6, further comprising:
performing, via the processor, an inverse DFT (IDFT) on the second windowed signal to produce a time signal; and
applying, via the processor, a frequency-shifting (FS) function to the time signal to produce a frequency-shifted signal,
wherein the FS function comprises $$FS2(k) = \exp^{\frac{j \times \pi \times k}{K}},$$

where FS2(k) represents the FS function, exp represents an exponential function, j represents the square root of minus one, π represents the value 3.14159, k represents a time sample index of the time signal in a time frame of K time samples, and K corresponds to a size of the IDFT.

8. The method of claim 7, further comprising applying, via the processor, a time-domain windowing (TDW) function to the time signal before applying the FS function.

9. The method of claim 5, wherein demultiplexing the second aggregated signal comprises performing, via the processor, a time-division demultiplexing on the second aggregated signal, and wherein the method further comprises:
performing, via the processor, a discrete Fourier transform (DFT) on the first demuliplexed signal before applying the second FDW function; and
performing, via the processor, an inverse DFT (IDFT) on the second windowed signal to produce a time signal.

10. A wireless fronthaul unit comprising:
a processor configured to:
apply a frequency-shifting (FS) function to one of a plurality of first communication channel signals in a time domain, wherein the FS function comprises $$FS2(k) = \exp^{\frac{j \times 2 \times \pi \times k}{K}},$$

where FS1(k) represents the FS function, exp represents an exponential function, j represents a square root of minus one, π represents the value 3.14159, k represents a time sample index of the one of the plurality of first communication channel signals in a time frame of K samples, and K corresponds to a size of a first DFT;
perform a plurality of discrete Fourier transforms (DFTs) on the plurality of first communication channel signals;
apply a plurality of frequency-domain windowing (FDW) functions to a plurality of wireless channel signals comprising digital in-phase quadrature-phase (IQ) samples to produce a plurality of windowed signals, with the FDW functions comprising a sequence of FDW coefficients, and with a first half of the FDW coefficients being symmetrical to a second half of the FDW coefficients;
aggregate the plurality of windowed signals to produce an aggregated signal, wherein aggregating the plurality of windowed signals comprises performing a frequency-division multiplexing (FDM) on the plurality of windowed signals; and
a frontend coupled to the processor and configured to transmit the aggregated signal to a corresponding wireless fronthaul unit over a wireless fronthaul link to facilitate wireless fronthaul communication.

11. The wireless fronthaul unit of claim 10, wherein the processor is further configured to:
perform a plurality of fast Fourier transforms (FFTs) on the plurality of wireless channel signals before applying the plurality of FDW functions; and
aggregate the plurality of windowed signals further by performing frequency-division multiplexing (FDM).

12. The wireless fronthaul unit of claim 11, wherein a first of the plurality of FDW functions comprises an even number of the FDW coefficients, wherein the first FDW function is applied to a first of the plurality of wireless channel signals, and wherein the processor is further configured to rotate a phase of the first of the plurality of wireless channel signals in a time domain before performing a first of the plurality of FFTs so that the first of the plurality of wireless channel signals comprises symmetrical positive frequency components and negative frequency components after performing the first FFT.

13. The wireless fronthaul unit of claim 12, wherein the processor is further configured to aggregate the plurality of windowed signals further by:
performing an inverse FFT (IFFT) after performing the FDM to produce an aggregated time signal;
applying a time-domain windowing (TDW) function to the aggregated time signal to produce a time-domain windowed signal; and
generating the aggregated signal according to the time-domain windowed signal.

14. The wireless fronthaul unit of claim 11, wherein the wireless fronthaul unit is a baseband unit (BBU), and wherein the plurality of wireless channel signals are downlink (DL) signals.

15. The wireless fronthaul unit of claim 10, wherein the wireless fronthaul unit is a remote radio unit (RRU), and wherein the plurality of wireless channel signals are uplink (UL) signals.

* * * * *

UNITED STATES PATENT AND TRADEMARK OFFICE
CERTIFICATE OF CORRECTION

PATENT NO. : 10,117,247 B2  
APPLICATION NO. : 15/057645  
DATED : October 30, 2018  
INVENTOR(S) : Huaiyu Zeng et al.

Page 1 of 1

It is certified that error appears in the above-identified patent and that said Letters Patent is hereby corrected as shown below:

In the Claims

Column 25, Lines 54-62, through Column 26, Lines 1-26, Claim 10 should read:
10. A wireless fronthaul unit comprising:
a processor configured to:
    apply a frequency-shifting (FS) function to one of a plurality of first communication channel signals in a time domain, wherein the FS function comprises $$FS1(k) = exp^{\frac{-j \times 2 \times \pi \times k}{2K}},$$

where $FS1(k)$ represents the FS function, *exp* represents an exponential function, *j* represents a square root of minus one, $\pi$ represents the value 3.14159, *k* represents a time sample index of the one of the plurality of first communication channel signals in a time frame of *K* samples, and *K* corresponds to a size of a first DFT;
    perform a plurality of discrete Fourier transforms (DFTs) on the plurality of first communication channel signals;
    apply a plurality of frequency-domain windowing (FDW) functions to a plurality of wireless channel signals comprising digital in-phase quadrature-phase (IQ) samples to produce a plurality of windowed signals, with the FDW functions comprising a sequence of FDW coefficients, and with a first half of the FDW coefficients being symmetrical to a second half of the FDW coefficients;
    aggregate the plurality of windowed signals to produce an aggregated signal, wherein aggregating the plurality of windowed signals comprises performing a frequency-division multiplexing (FDM) on the plurality of windowed signals; and
    a frontend coupled to the processor and configured to transmit the aggregated signal to a corresponding wireless fronthaul unit over a wireless fronthaul link to facilitate wireless fronthaul communication.

Signed and Sealed this  
Fifteenth Day of January, 2019

Andrei Iancu  
*Director of the United States Patent and Trademark Office*